(12) United States Patent
Ryu et al.

(10) Patent No.: US 11,553,458 B2
(45) Date of Patent: Jan. 10, 2023

(54) APPARATUS AND METHOD FOR SELECTING RESOURCES IN WIRELESS COMMUNICATION SYSTEM

(71) Applicant: Samsung Electronics Co., Ltd., Suwon-si (KR)

(72) Inventors: Hyunseok Ryu, Suwon-si (KR); Anil Agiwal, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 16/924,744

(22) Filed: Jul. 9, 2020

(65) Prior Publication Data

US 2021/0014831 A1 Jan. 14, 2021

(30) Foreign Application Priority Data

Jul. 9, 2019 (KR) .................... 10-2019-0082665
Mar. 9, 2020 (KR) .................... 10-2020-0029287

(51) Int. Cl.
*H04W 72/02* (2009.01)
*H04W 72/04* (2009.01)
(Continued)

(52) U.S. Cl.
CPC ........... *H04W 72/02* (2013.01); *H04L 5/0092* (2013.01); *H04W 72/042* (2013.01);
(Continued)

(58) Field of Classification Search
CPC ............... H04W 72/02; H04W 72/042; H04W 72/0493; H04W 76/11; H04W 92/18; H04W 76/14; H04L 5/0092
See application file for complete search history.

(56) References Cited

U.S. PATENT DOCUMENTS

2018/0027563 A1* 1/2018 Nguyen ................ H04L 5/0039
370/329
2018/0332585 A1 11/2018 Faurie et al.
(Continued)

OTHER PUBLICATIONS

3GPP TSG RAN1 WG1 Meeting #96; R1-1901815, Source: MediaTek Inc.; Title: Coexistence mechanisms between NR-V2X and LTE-V2X, Athens, Greece, Feb. 25-Mar. 1, 2019. (Year: 2019).*
(Continued)

*Primary Examiner* — Mohammed S Chowdhury
(74) *Attorney, Agent, or Firm* — Jefferson IP Law, LLP

(57) ABSTRACT

The disclosure relates to a pre-$5^{th}$-Generation (5G) or 5G communication system to be provided for supporting higher data rates Beyond $4^{th}$-Generation (4G) communication system such as Long Term Evolution (LTE). The disclosure pertains to selection of resources in a wireless communication system. A method of operating a User Equipment (UE) is provided. The method includes acquiring configuration information of a plurality of sidelink resource pools and transmitting a sidelink signal to another UE using one resource pool among the plurality of sidelink resource pools. The plurality of sidelink resource pools may be configured within an equal Bandwidth Part (BWP).

18 Claims, 24 Drawing Sheets

(51) Int. Cl.
*H04L 5/00* (2006.01)
*H04W 76/11* (2018.01)
*H04W 92/18* (2009.01)

(52) U.S. Cl.
CPC ........ *H04W 72/0493* (2013.01); *H04W 76/11* (2018.02); *H04W 92/18* (2013.01)

(56) References Cited

U.S. PATENT DOCUMENTS

| | | | |
|---|---|---|---|
| 2020/0053835 A1* | 2/2020 | Ye | H04W 28/0278 |
| 2020/0275450 A1* | 8/2020 | Lee | H04W 72/042 |
| 2020/0275501 A1* | 8/2020 | Lee | H04W 24/10 |
| 2020/0314819 A1* | 10/2020 | Loehr | H04W 72/042 |
| 2021/0153262 A1* | 5/2021 | Mochizuki | H04W 74/006 |
| 2021/0337544 A1* | 10/2021 | Wang | H04W 4/06 |

OTHER PUBLICATIONS

3GPP TSG RAN WG1 Meeting #96; R1-1903067, Source: Huawei, HiSilicon, Title: Discussion on NR Uu to control LTE sidelink, Athens, Greece, Feb. 25-Mar. 1, 2019. (Year: 2019).*

3GPP TSG RAN WG1 Meeting #97; R1-1906010, Source: Huawei, HiSilicon, Title: Discussion on sidelink resource allocation mode 1, Reno, USA, May 13-17, 2019. (Year: 2019).*

Lenovo, Motorola Mobility, Deutsche Telekom, "NR Uu controlling LTE sidelink", 3GPP TSG RAN WG1 #97, Reno, USA, May 13-17, 2019, R1-1907480, May 3, 2019.

Vivo, "Support of NR Uu controlling LTE sidelink", 3GPP TSG RAN WG1 Meeting #97, Reno, USA, May 13-17, 2019, R1-1906144, May 1, 2019.

NTT Docomo, Inc., "NR Sidelink Resource Allocation Mechanism Mode 1", 3GPP TSG RAN WG1 #97, Reno, USA, May 13-17, 2019, R1-1906206, May 3, 2019.

Spreadtrum Communications, "Discussion on NR sidelink mode 1 resource allocation", 3GPP TSG RAN WG1 #97, Reno, USA, May 13-17, 2019, R1-1906363, May 2, 2019.

International Search Report dated Oct. 21, 2020, issued in International Application No. PCT/KR2020/009039.

Written Opinion dated Oct. 21, 2020, issued in International Application No. PCT/KR2020/009039.

Qualcomm Incorporated; Enhancements of NR Uu to control LTE sidelink; 3GPP TSG-RAN WG2 Meeting #103bis; R2-1814956; Oct. 8-12, 2018; Chengdu, China.

Vivo; Discussion on mode 1 resource allocation mechanism; 3GPP TSG RAN WG1 #97; R1-1906138; May 13-17, 2019; Reno, USA.

Intel Corporation; Design aspects for NR V2X sidelink communication in resource allocation Mode-1; 3GPP TSG RAN WG1 Meeting #97; R1-1906795; May 13-17, 2019; Reno, USA.

Extended European Search Report dated May 25, 2022; European Appln. No. 20837153.4-1215/3984304 PCT/KR2020009039.

* cited by examiner

APPARATUS AND METHOD FOR SELECTING RESOURCES IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0082665, filed on Jul. 9, 2019, in the Korean Intellectual Property Office, and of a Korean patent application number 10-2020-0029287, filed on Mar. 9, 2020, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and a method for selecting resources in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G communication systems support vehicle communication. In the case of vehicle communication, standardization of LTE-based vehicle-to-everything (V2X) has been completed in 3GPP Rel-14 and Rel-15 based on Device-to-Device (D2D) communication, and research on the development of V2X based on 5G New Radio (NR) is currently underway. In NR V2X, unicast communication, groupcast communication, multicast communication, and broadcast communication is supported between user equipments (UEs). Further, NR V2X aims at providing further evolved services such as platooning, advanced driving, extended sensor, and remote driving, unlike LTE V2X, aiming at transmitting and receiving basic safety information required for driving of vehicles.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively providing a sidelink service in a wireless communication system.

Another aspect of the disclosure is to provide an apparatus and a method for configuring a plurality of sidelink resource pools in a wireless communication system.

Another aspect of the disclosure is to provide an apparatus and a method for selecting one of a plurality of resource pools when the plurality of sidelink resource pools is configured in a wireless communication system.

Another aspect of the disclosure is to provide an apparatus and a method for transmitting sidelink control information and data information through resources selected within a sidelink resource pool selected by a sidelink transmission user equipment (UE) in a wireless communication system.

Additional aspects will be set forth in part in the description which follows and, in part, will be apparent from the description, or may be learned by practice of the presented embodiments.

In accordance with an aspect of the disclosure, a method of operating a UE in a wireless communication system is provided. The method includes acquiring configuration information of a plurality of sidelink resource pools, and transmitting a sidelink signal to another UE using one resource pool among the plurality of sidelink resource pools. The plurality of sidelink resource pools may be configured within an equal Bandwidth Part (BWP).

In accordance with another aspect of the disclosure, a UE in a wireless communication system is provided. The UE includes a transceiver, and at least one processor operatively coupled to the transceiver. The at least one processor may be configured to control to acquire configuration information of a plurality of sidelink resource pools and transmit a sidelink signal to another UE using one resource pool among the plurality of sidelink resource pools. The plurality of sidelink resource pools may be configured within an equal BWP.

An apparatus and a method according to various embodiments can improve reception reliability of sidelink control information, data, and feedback information and efficiency of the use of resources in vehicle communication or Device-to-Device (D2D) communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
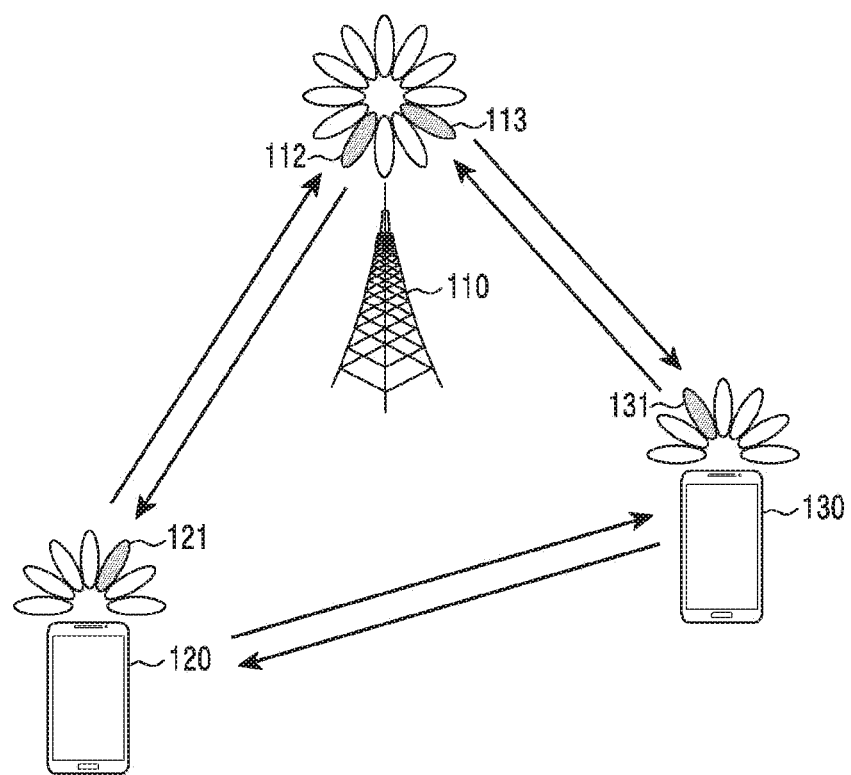
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure described hereinafter relates to an apparatus and a method for selecting resources in a wireless communication system. More specifically, the disclosure pertains to the selection of transmission resources for a UE performing sidelink communication between UEs, and relates to a method and an apparatus for selecting at least one resource pool for communication when a plurality of resource pools for sidelink communication is configured.

Terms referring to a signal used in the following description, terms referring to a channel, terms referring to control information, terms referring to network entities, and terms referring to elements of a device are used only for convenience of description. Accordingly, the disclosure is not limited to those terms, and other terms having the same technical meanings may be used.

In the following description, the terms "physical channel" and "signal" may be interchangeably used with "data" or "control signal". For example, "Physical Downlink Shared Channel (PDSCH)" is a term referring to a physical channel for transmitting data, but may be used to refer to data. That is, in the disclosure, the expression "transmit a physical channel" may be interpreted to be the same as the expression "transmit data or a signal through a physical channel".

In the disclosure, "higher-layer signaling" refers to a method of transmitting a signal from a BS to a UE through a downlink data channel of a physical layer or from a UE to a BS through an uplink data channel of a physical layer. Higher-layer signaling may be understood as Radio Resource Control (RRC) signaling or a Media Access Control (MAC) Control Element (CE).

Further, in the disclosure, the expressions "larger than" or "smaller than" may be used to indicate whether a specific condition is satisfied or fulfilled, but are used only to indicate examples, and do not exclude "larger than or equal to" or "equal to or smaller than". A condition indicating "larger than or equal to" may be replaced with "larger than", a condition indicating "equal to or smaller than" may be replaced with "smaller than", and a condition indicating "larger than or equal to and smaller than" may be replaced with "larger than and smaller than or equal to".

Further, the disclosure describes various embodiments using terms used in some communication standards (for example, the $3^{rd}$-Generation Partnership Project (3GPP)), but this is only an example. Various embodiments may be easily modified and applied to other communication systems.

In the disclosure, a transmission UE is a UE that transmits sidelink data and control information or a UE that receives sidelink feedback information. Further, in the disclosure, a reception UE is a UE that receives sidelink data and control information or a UE that transmits sidelink feedback information.

In the disclosure, the PSFCH, PSCCH, and PSSCH included in the present disclosure refer to physical channels for NR or LTE, and are not limited to any one.

FIG. 1 illustrates a wireless communication system according to an embodiment of the disclosure.

Referring to FIG. 1, it illustrates a BS 110, a UE 120, and a UE 130 as parts of nodes using a radio channel in a wireless communication system. Although FIG. 1 illustrates only one BS, another BS that is the same as or similar to the BS 110 may be further included.

The BS 110 is a network infrastructure element that provides radio access to the UEs 120 and 130. The BS 110 has coverage defined in a predetermined geographical area based on the range within which a signal can be transmitted and received. The BS 110 may be referred to as an "Access Point (AP)", an "eNodeB (eNB)", a "$5^{th}$-Generation (5G) node", a "g NodeB (next generation node B (gNB))", a "wireless point", or a "Transmission/Reception Point (TRP)", or using another term having a technical meaning equivalent thereto, as well as "base station".

Each of the UE 120 and the UE 130 is a device used by a user and communicates with the BS 110 through a radio channel. A link from the BS 110 to the UE 120 or the UE 130 is referred to as a downlink (DL), and a link from the UE 120 or the UE 130 to the BS 110 is referred to as an uplink (UL). The UE 120 and the UE 130 communicate with each other through a radio channel. At this time, a link between the UE 120 and the UE 130 is referred to as a sidelink, and the sidelink may be interchangeably used with a PC-5 interface. Depending on circumstances, at least one of the UE 120 or the UE 130 may be operated without any involvement by the user. That is, at least one of the terminals 120 or 130 may be a device that performs Machine-Type Communication (MTC), and may not be carried by the user. Each of the UE 120 and the UE 130 may be referred to as a "user equipment (UE)", "mobile station", "subscriber station", "remote terminal", "wireless terminal", or "user device", or using another term having an equivalent technical meaning, as well as "terminal".

The BS 110, the UE 120, and the UE 130 may transmit and receive a wireless signal in a millimeter-wave (mmWave) band (of, for example, 28 GHz, 30 GHz, 38 GHz, or 60 GHz). At this time, in order to increase a channel gain, the BS 110, the UE 120, and the UE 130 may perform beamforming. The beamforming may include transmission beamforming and reception beamforming. That is, the BS 110, the UE 120, and the UE 130 may assign directivity to a transmission signal or a reception signal. To this end, the BS 110 and the UEs 120 and 130 may select serving beams 112, 113, 121, and 131 through a beam search procedure or beam management procedure. After the serving beams 112, 113, 121, and 131 are selected, communication may be performed through resources having a quasi-co-located (QCL) relationship with resources through which the serving beams 112, 113, 121, and 131 are transmitted.

If the large-scale characteristics of a channel for transmitting symbols through a first antenna port can be inferred from a channel for transmitting symbols through a second antenna port, the first antenna port and the second antenna port may be evaluated to have a QCL relationship therebetween. For example, the large-scale characteristics may include at least one of delay spread, Doppler spread, Doppler shift, average gain, average delay, or spatial receiver parameters.

Figure 2:
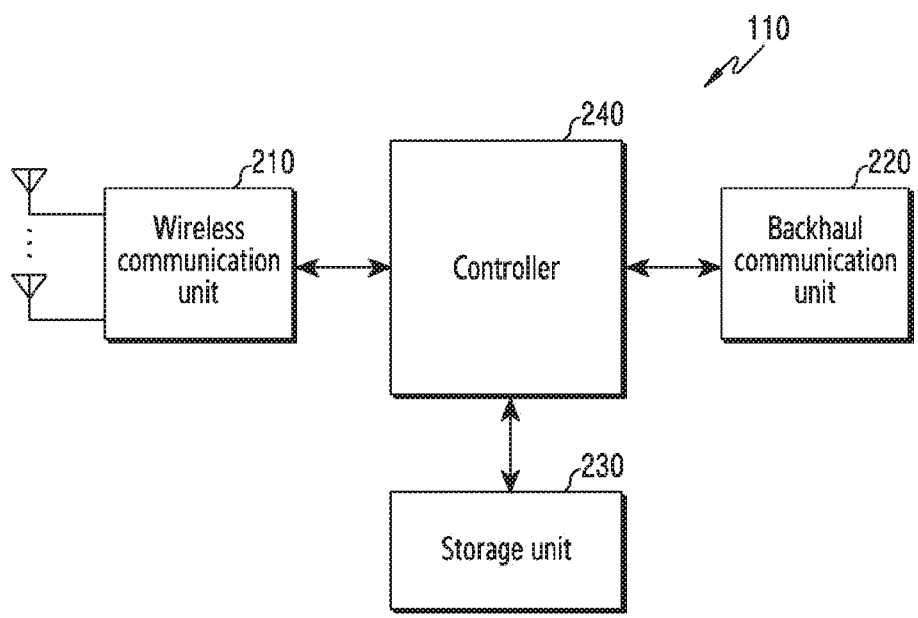
FIG. 2 illustrates the configuration of a base station (BS) in a wireless communication system according to an embodiment of the disclosure.

FIG. 2 illustrates the configuration of a BS in a wireless communication system according to an embodiment of the disclosure.

The configuration illustrated in FIG. 2 may be understood to be the configuration of the BS 110. The suffix "-unit" or "-er" used hereinafter may refer to a unit for processing at least one function or operation, and may be implemented as hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving a signal through a radio channel. For example, the wireless communication unit 210 performs a function of conversion between a baseband signal and a bitstream according to the physical-layer standard of the system. For example, in data transmission, the wireless communication unit 210 generates complex symbols by encoding and modulating a transmission bitstream. In data reception, the wireless communication unit 210 reconstructs a reception bitstream by demodulating and decoding a baseband signal.

The wireless communication unit 210 up-converts a baseband signal into a Radio-Frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a Digital-to-Analog Convertor (DAC), an Analog-to-Digital Convertor (ADC), and the like. Further, the wireless communication unit 210 may include a plurality of transmission/reception paths. In addition, the wireless communication unit 210 may include at least one antenna array including a plurality of antenna elements.

On the hardware side, the wireless communication unit 210 may include a digital unit and an analog unit, and the analog unit may include a plurality of sub-units according to operating power, operating frequency, and the like. The digital unit may be implemented by at least one processor (for example, a Digital Signal Processor (DSP)).

The wireless communication unit 210 transmits and receives a signal as described above. Accordingly, all or part of the wireless communication unit 210 may be referred to as a "transmitter", a "receiver", or a "transceiver". Further, in the following description, transmission and reception performed through a radio channel may include the above-described processing by the wireless communication unit 210.

The backhaul communication unit 220 provides an interface for communicating with other nodes within the network. That is, the backhaul communication unit 220 converts a bitstream transmitted from the BS to another node, for example, another access node, another BS, a higher node, or a core network, into a physical signal, and converts a physical signal received from another node into a bitstream.

The storage unit 230 may store data such as a basic program for the operation of the BS, an application, and configuration information. The storage unit 230 may include volatile memory, nonvolatile memory, or a combination of volatile memory and nonvolatile memory. The storage unit 230 provides stored data in response to a request from the controller 240.

The controller 240 may control the overall operation of the BS. For example, the controller 240 transmits and receives a signal through the wireless communication unit 210 or the backhaul communication unit 220. The controller 240 records data in the storage unit 230 and reads the same. The controller 240 may perform the functions of a protocol stack required according to communication standards. According to another implementation, the protocol stack may be included in the wireless communication unit 210. To this end, the controller 240 may include at least one processor. According to various embodiments, the controller 240 may control the BS to perform operations according to various embodiments described below.

Figure 3:
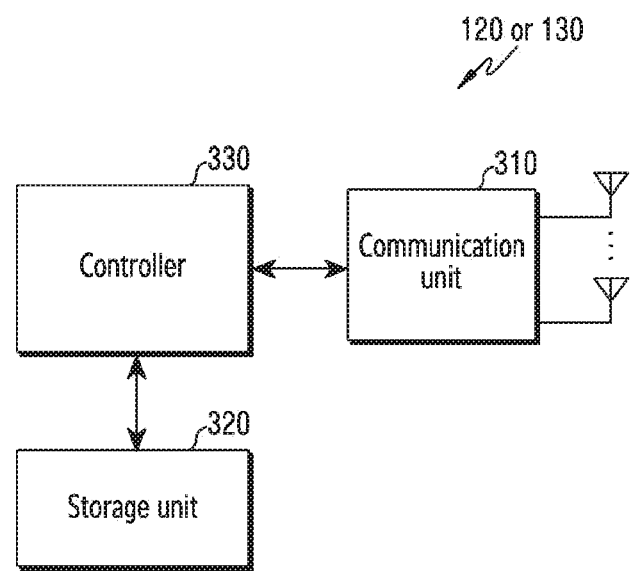
FIG. 3 illustrates the configuration of a UE in a wireless communication system according to an embodiment of the disclosure.

FIG. 3 illustrates the configuration of a UE in a wireless communication system according to an embodiment of the disclosure.

The configuration illustrated in FIG. 3 may be understood as the configuration of the UE 120. The configuration illustrated in FIG. 3 may similarly be understood as the configuration of the UE 130. The suffix "-unit" or "-er" used hereinafter may refer to a unit for processing at least one function or operation, and may be implemented as hardware, software, or a combination of hardware and software.

Referring to FIG. 3, the UE includes a communication unit 310, a storage unit 320, and a controller 330.

The communication unit 310 performs functions for transmitting and receiving a signal through a radio channel. For example, the communication unit 310 performs a function of conversion between a baseband signal and a bitstream according to a physical-layer standard of the system. For example, in data transmission, the communication unit 310 generates complex symbols by encoding and modulating a transmission bitstream. In data reception, the communication unit 310 reconstructs a reception bitstream by demodulating and decoding a baseband signal. Further, the communication unit 310 up-converts a baseband signal to an RF band signal, transmits the RF band signal through an antenna, and then down-converts the RF band signal received through the antenna to the baseband signal. For example, the communication unit 310 may include a transmission filter, a reception filter, an amplifier, a mixer, an oscillator, a DAC, and an ADC.

The communication unit 310 may include a plurality of transmission/reception paths. The communication unit 310 may include at least one antenna array including a plurality of antenna elements. On the hardware side, the communication unit 310 may include a digital circuit and an analog circuit (for example, a Radio-Frequency Integrated Circuit (RFIC)). The digital circuit and the analog circuit may be implemented as a single package. The communication unit 310 may include a plurality of RF chains. The communication unit 310 may perform beamforming.

The communication unit 310 transmits and receives a signal as described above. Accordingly, all or some of the communication unit 310 may be referred to as a "transmitter", a "receiver", or a "transceiver". In the following description, transmission and reception performed through a radio channel are used to have a meaning including the processing performed by the communication unit 310.

The storage unit 320 stores data such as a basic program, an application, and configuration information for the operation of the UE. The storage unit 320 may include volatile memory, nonvolatile memory, or a combination of volatile memory and nonvolatile memory. The storage unit 320 provides stored data in response to a request from the controller 330.

The controller 330 controls the overall operation of the UE. For example, the controller 330 transmits and receives a signal through the communication unit 310. The controller 330 records data in the storage unit 320 and reads the same. The controller 330 may perform the functions of a protocol stack required by the communication standard. To this end, the controller 330 may include at least one processor or microprocessor, or may be a part of the processor. Further, the part of the communication unit 310 or the controller 330 may be referred to as a Communications Processor (CP). According to various embodiments, the controller 330 may control the UE to perform operations according to various embodiments described below.

Figure 4:
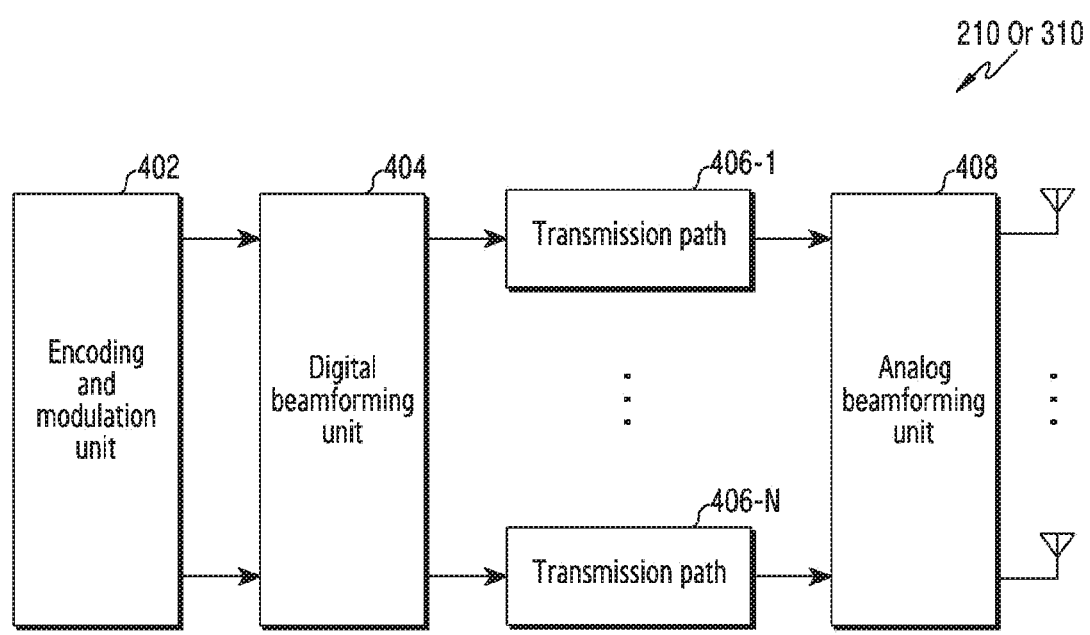
FIG. 4 illustrates the configuration of a communication unit in a wireless communication system according to an embodiment of the disclosure.

FIG. 4 illustrates the configuration of a communication unit in a wireless communication system according to an embodiment of the disclosure.

FIG. 4 illustrates an example of the detailed configuration of the wireless communication unit 210 of FIG. 2 or the communication unit 310 of FIG. 3. Specifically, FIG. 4 illustrates elements for performing beamforming as the part of the wireless communication unit 210 of FIG. 2 or the communication unit 310 of FIG. 3.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of low-density parity check (LDPC) code, convolution code, or polar code may be used. The encoding and modulation unit 402 generates modulation symbols by performing constellation mapping.

The digital beamforming unit 404 performs beamforming on a digital signal (for example, modulation symbols). To this end, the digital beamforming unit 404 multiplies modulation symbols by beamforming weights. The beamforming weight values may be used for changing the size and phase of the signal, and may be referred to as a "precoding matrix" or a "precoder". The digital beamforming unit 404 outputs digitally beamformed modulation symbols through the plurality of transmission paths 406-1 to 406-N. At this time, according to a Multiple-Input Multiple-Output (MIMO) transmission scheme, the modulation symbols may be multiplexed, or the same modulation symbols may be provided to the plurality of transmission paths 406-1 to 406-N.

The plurality of transmission paths 406-1 to 406-N converts the digitally beamformed digital signals into analog signals. To this end, each of the plurality of transmission paths 406-1 to 406-N may include an inverse fast Fourier transform (IFFT) calculator, a cyclic prefix (CP) inserter, a DAC, and an up-converter. The CP inserter is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provides independent signal-processing processes for a plurality of streams generated through the digital beamforming. However, depending on an implementation scheme, some of the elements of the plurality of transmission paths 406-1 to 406-N may be used in common.

The analog beamforming unit 408 performs beamforming on an analog signal. To this end, the digital beamforming unit 404 multiplies analog signals by beamforming weights. The beamforming weights are used to change the size and phase of the signal. Specifically, the analog beamforming unit 440 may be variously configured according to a connection structure between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In another example, the plurality of transmission paths 406-1 to 406-N may be adaptively connected to one antenna array or to two or more antenna arrays.

Figure 5A:
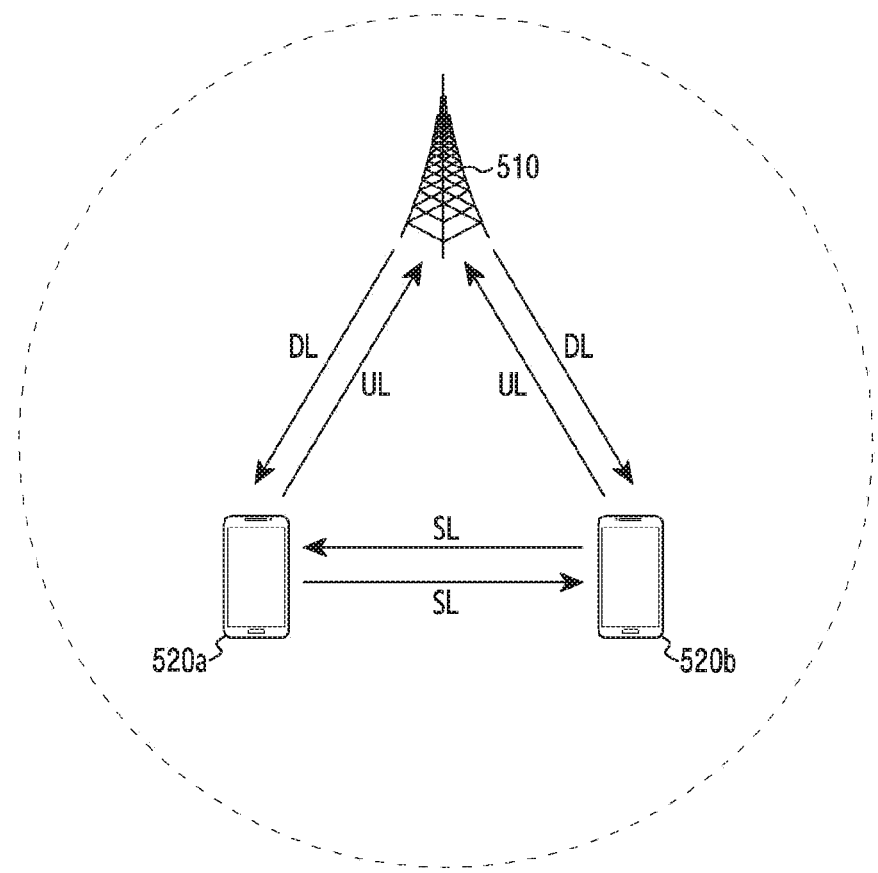
FIG. 5A illustrates an example of a scenario for sidelink communication in a wireless communication system according to an embodiment of the disclosure.

FIG. 5A illustrates an example of a scenario for sidelink communication in a wireless communication system according to an embodiment of the disclosure.

Figure 5B:
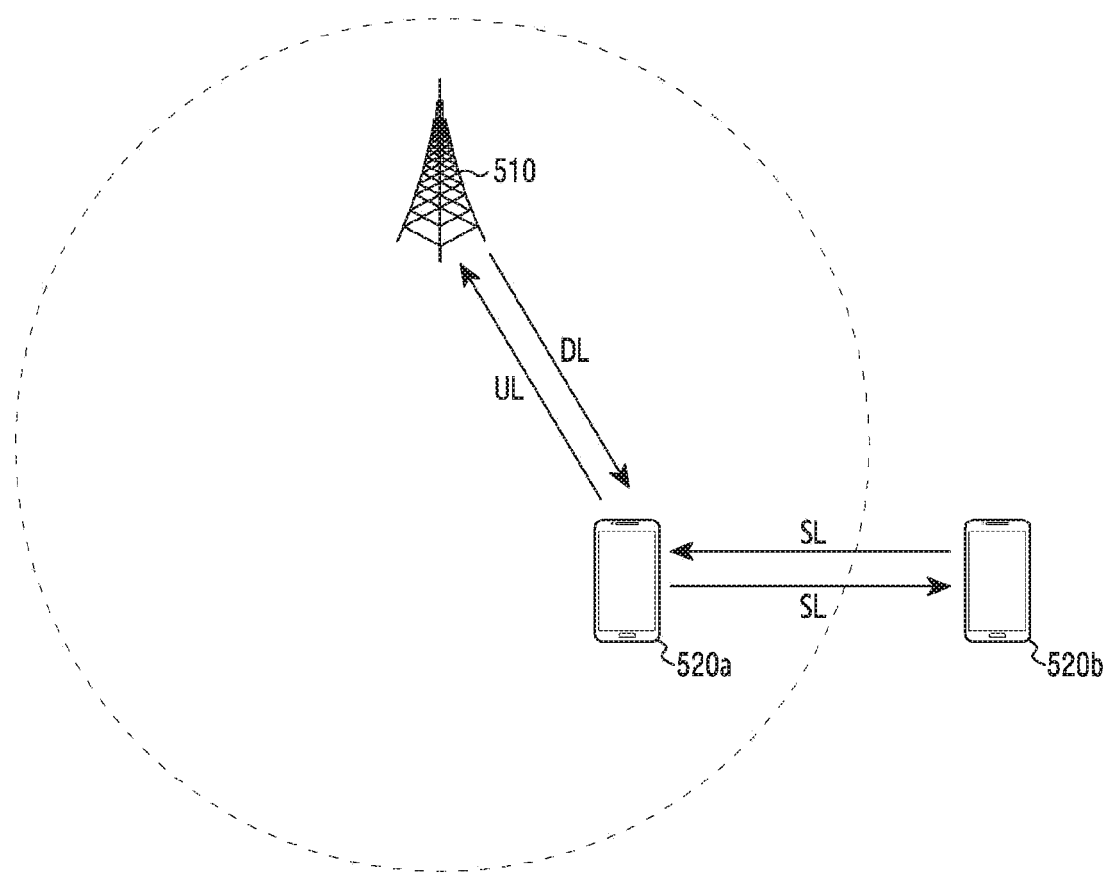
FIG. 5B illustrates an example of a scenario for sidelink communication in a wireless communication system according to an embodiment of the disclosure.

FIG. 5B illustrates an example of a scenario for sidelink communication in a wireless communication system according to an embodiment of the disclosure.

Figure 5C:
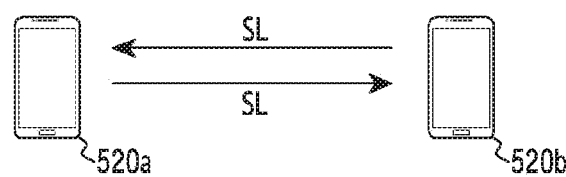
FIG. 5C illustrates an example of a scenario for sidelink communication in a wireless communication system according to an embodiment of the disclosure.

FIG. 5C illustrates an example of a scenario for sidelink communication in a wireless communication system according to an embodiment of the disclosure.

Figure 5D:
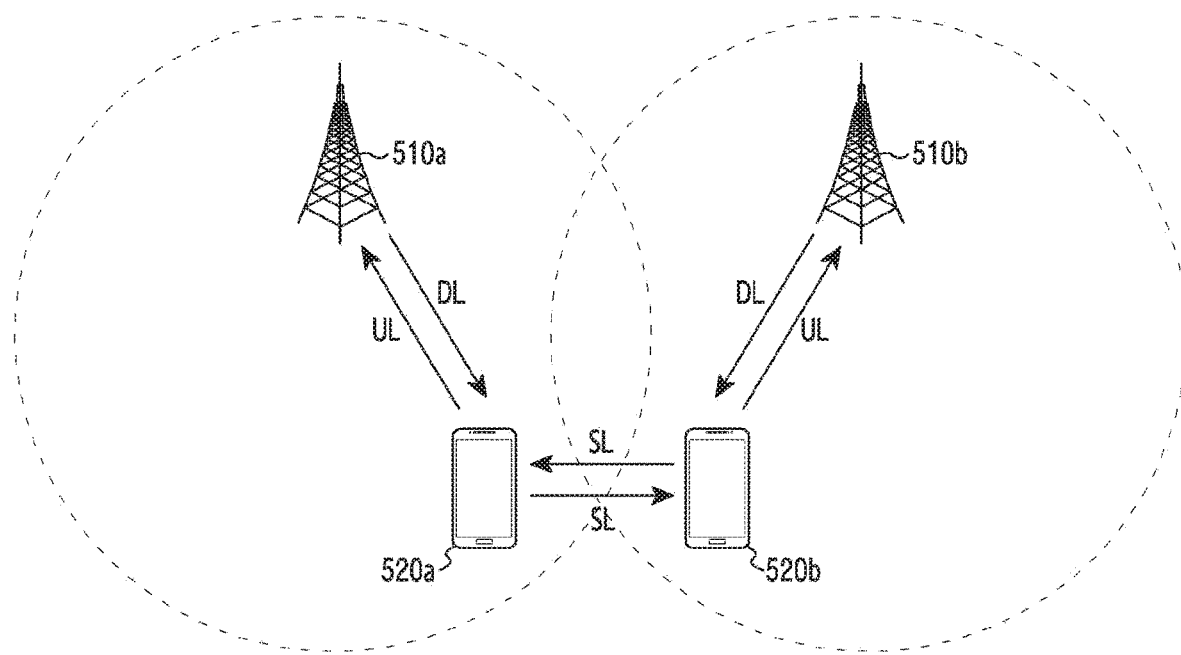
FIG. 5D illustrates an example of a scenario for sidelink communication in a wireless communication system according to an embodiment of the disclosure.

FIG. 5D illustrates an example of a scenario for sidelink communication in a wireless communication system according to an embodiment of the disclosure.

FIG. 5A illustrates an in-coverage scenario when sidelink UEs 520a and 520b are located within the coverage of a BS 510. The sidelink UEs 520a and 520b may receive data and control information from the BS 510 through a downlink (DL) or transmit data and control information to the BS through an uplink (UL). The data and control information may be data and control information for sidelink communication or data and control information for general cellular communication rather than sidelink communication.

Referring to FIG. 5A, the sidelink UEs 520a and 520b may transmit and receive data and control information for sidelink communication through a sidelink.

FIG. 5B illustrates the case of partial coverage in which the first UE 520a among the sidelink UEs is located inside the coverage of the BS 510 and the second UE 520b is located outside the coverage of the BS 510. The first UE 520a located inside the coverage of the BS 510 may receive data and control information from the BS through a downlink or transmit data and control information to the BS through an uplink. The second UE 520b located outside the coverage of the BS 510 cannot receive data and control information from the BS through a downlink and cannot transmit data and control information to the BS through an uplink. The second UE 520b may transmit and receive data and control information for sidelink communication to and from the first UE 520a through a sidelink.

FIG. 5C illustrates the case in which sidelink UEs (for example, the first UE 520a and the second UE 520b) are located outside the coverage of the BS 510. Accordingly, the first UE 520a and the second UE 520b cannot receive data and control information from the BS through a downlink and cannot transmit data and control information to the BS through an uplink. The first UE 520a and the second UE 520b may transmit and receive data and control information for sidelink communication through a sidelink.

FIG. 5D illustrates the case of inter-cell sidelink communication in which the first UE 520a and the second UE 520b performing sidelink communication access different BSs (for example, a first BS 510a and a second BS 510b) (for example, an RRC-connected state) or camp thereon (for example, an RRC connection-released state, that is, an RRC-idle state). At this time, the first UE 520a may be a sidelink transmission UE, and the second UE 520b may be a sidelink reception UE. Alternatively, the first UE 520a may be a sidelink reception UE, and the second UE 520b may be a sidelink transmission UE. The first UE 520a may receive a sidelink-dedicated System Information Block (SIB) from the BS 510 which the first UE 520a accesses (or on which the first UE 520a camps), and the second UE 520b may receive a sidelink-dedicated SIB from another BS 510b which the second UE 520b accesses (or on which the second UE 520b camps). At this time, information on the sidelink-dedicated SIB received by the first UE 520a may be different from information on the sidelink-dedicated SIB received by the second UE 520b. Accordingly, it may be required to unify the information to perform sidelink communication between UEs located in different cells.

Referring to FIGS. 5A to 5D, although the sidelink system including two UEs (for example, the first UE 510a and the second UE 520b) has been described, the disclosure is not limited thereto, and may be applied to a sidelink system in which three or more UEs participate. The uplink and the downlink between the BS 510 and sidelink UEs may be referred to as a Uu interface, and the sidelink between sidelink UEs may be referred to as a PC-5 interface. Hereinafter, the uplink or the downlink and the Uu interface, the sidelink, and the PC-5 may be interchangeably used.

Meanwhile, in the disclosure, the UE may be a vehicle supporting Vehicle-to-Vehicle (V2V) communication, a vehicle or a handset (for example, a smartphone) of a pedestrian supporting Vehicle-to-Pedestrian (V2P) communication, a vehicle supporting Vehicle-to-Network (V2N) communication, or a vehicle supporting Vehicle-to-Infrastructure (V2I) communication. In the disclosure, the UE may be a Road Side Unit (RSU) having a UE function, an RSU having a BS function, or an RSU having some of the BS function and some of the UE function.

Figure 6A:
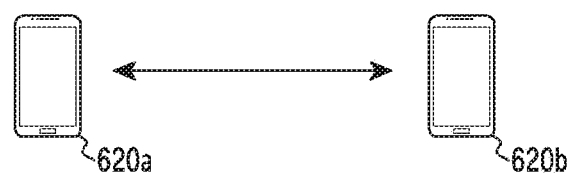
FIG. 6A illustrates an example of a sidelink communication transmission scheme in a wireless communication system according to an embodiment of the disclosure.

FIG. 6A illustrates an example of a sidelink communication transmission scheme in a wireless communication system according to an embodiment of the disclosure.

Figure 6B:
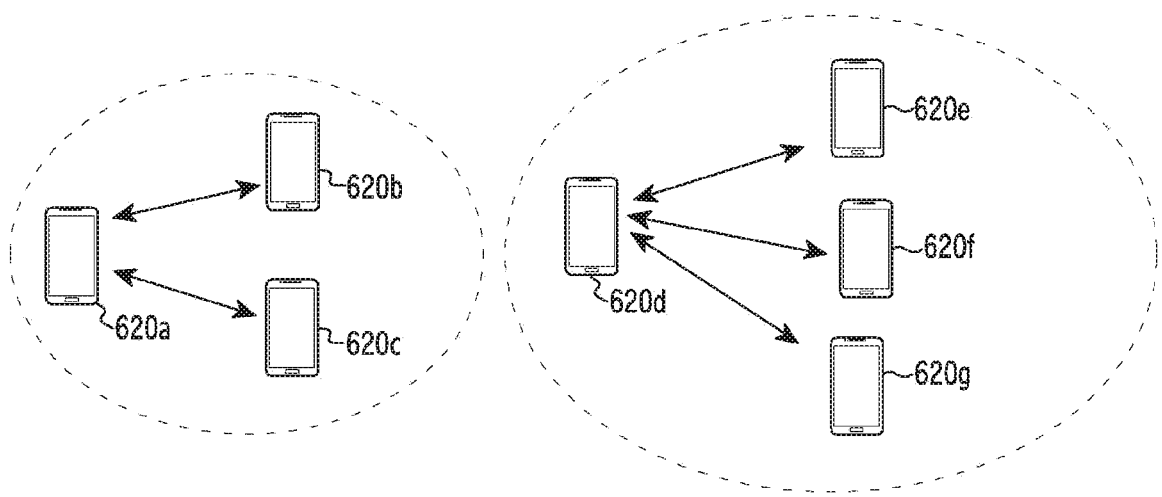
FIG. 6B illustrates an example of a sidelink communication transmission scheme in a wireless communication system according to an embodiment of the disclosure.

FIG. 6B illustrates an example of a sidelink communication transmission scheme in a wireless communication system according to an embodiment of the disclosure.

FIG. 6A illustrates a unicast scheme and FIG. 6B illustrates a groupcast scheme.

Referring to FIG. 6A, a transmission UE 620a and a reception UE 620b may perform one-to-one communication.

The transmission scheme illustrated in FIG. 6A may be referred to as unicast communication.

Referring to FIG. 6B, the transmission UE 620a or 620d and reception UEs 620b, 620c, 620e, 620f, and 620g may perform one-to-many communication. The transmission scheme illustrated in FIG. 6B may be referred to as groupcast or multicast. In FIG. 6B, the first UE 620a, the second UE 620b, and the third UE 620c form one group, and perform groupcast communication, and the fourth UE 620d, the fifth UE 620e, the sixth UE 620f, and the seventh UE 620g form another group, and perform groupcast communication. UEs may perform groupcast communication within the group to which the UEs belong and may perform unicast, groupcast, or broadcast communication with at least one other UE belonging to another group. Although FIG. 6B illustrates two groups, the disclosure is not limited thereto and may be applied to the case in which a larger number of groups is formed.

Meanwhile, although not illustrated in FIG. 6A or 6B, sidelink UEs may perform broadcast communication. Broadcast communication is a scheme in which all sidelink UEs receive data and control information transmitted by a sidelink transmission UE through a sidelink. For example, when the first UE 620a is a transmission UE in FIG. 6B, the remaining UEs 620b, 620c, 620d, 620e, 620f, and 620g may receive data and control information transmitted by the first UE 620a.

The sidelink unicast communication, groupcast communication, and broadcast communication may be supported in an in-coverage scenario, a partial-coverage scenario, or an out-of-coverage scenario.

Unlike an LTE sidelink, an NR sidelink may consider supporting a transmission type in which a vehicle UE transmits data only to one specific UE through unicast and a transmission type in which a vehicle UE transmits data to a plurality of specific UEs through groupcast. For example, when a service scenario such as platooning, which is a technology in which two or more vehicles are connected through one network and move in a cluster form, is considered, the unicast and groupcast technologies may be useful. Specifically, unicast communication may be used to control one specific UE by a leader UE in a group connected through platooning, and groupcast communication may be used to control a group including a plurality of specific UEs.

In the sidelink system, resource allocation may follow mode 1 or mode 2 below.

(1) Resource Allocation in Mode 1

Mode 1 is a scheme based on scheduled resource allocation by a BS. More specifically, in resource allocation in mode 1, the BS may allocate resources used for sidelink transmission to RRC-connected UEs according to a dedicated scheduling scheme. Since the BS can manage resources of the sidelink, scheduled resource allocation is advantageous in managing interference and a resource pool (for example, dynamic allocation and/or semi-persistent transmission). When the RRC-connected mode UE has data to be transmitted to another UE(s), the UE may transmit information indicating that the UE has data to be transmitted to another UE(s) to the BS through an RRC message or a MAC control element. For example, the RRC message indicating the existence of data may be a sidelink UE information (SidelinkUEInformation) message or a UE assistance information (UEAssistanceInformation) message. For example, the MAC control element indicating the existence of data may be a Buffer Status Report (BSR) MAC control element for sidelink communication or a Scheduling Request (SR). The buffer status report includes at least one of an indicator indicating the BSR or information on the size of buffered data for sidelink communication. Since the BS schedules resources to the sidelink transmission UE when mode 1 is applied, mode 1 may be applied only when the sidelink transmission UE is within the coverage of the BS.

(2) Resource Allocation in Mode 2

Mode 2 is a scheme based on UE autonomous resource selection in which the sidelink transmission UE selects resources. Specifically, according to mode 2, the BS provides a sidelink transmission/reception resource pool for a sidelink to the UE through system information or an RRC message (for example, an RRC reconfiguration (RRCReconfiguration) message or a PC-5 RRC message) and the transmission UE selects a resource pool and resources according to a predetermined rule. Since the BS provides configuration information for the sidelink resource pool, mode 2 may be used when the sidelink UE is within the coverage of the BS. When the sidelink UE is outside the coverage of the BS, the sidelink UE may perform the operation according to mode 2 in a pre-configured resource pool. For example, as a UE autonomous selection method, zone mapping, sensing-based resource selection, or random selection may be used.

(3) Others

In addition, even though the UE is located within the coverage of the BS, scheduled resource allocation, resource allocation in the UE autonomous resource selection mode, or resource selection may not be performed. In this case, the UE may perform sidelink communication through the pre-configured resource pool.

Figure 7:
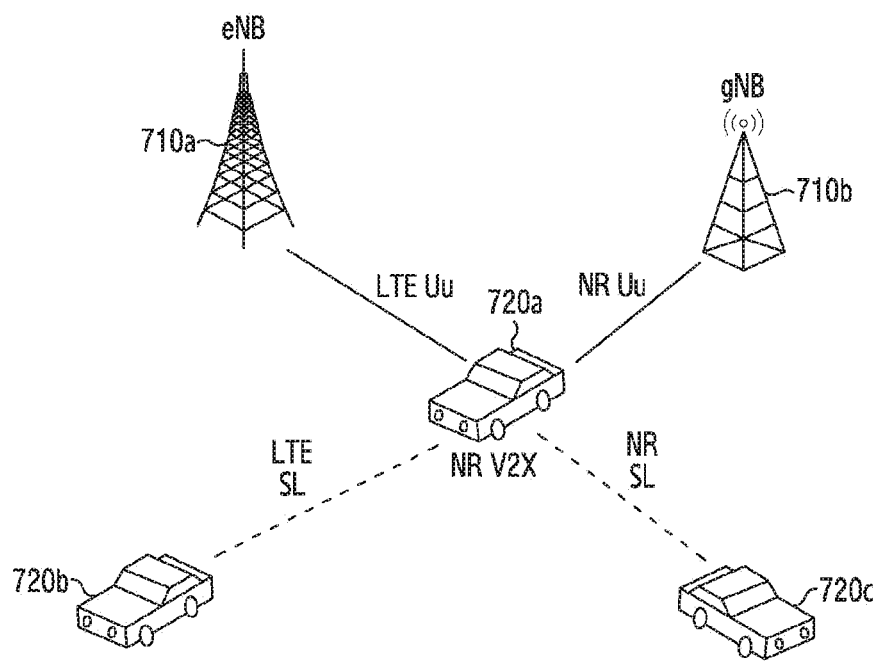
FIG. 7 illustrates an example of links related to sidelink communication in a wireless communication system according to an embodiment of the disclosure.

FIG. 7 illustrates an example of links related to sidelink communication in a wireless communication system according to an embodiment of the disclosure.

Referring to FIG. 7, sidelink communication may be performed through at least one of the following links.

A link between an NR sidelink UE 720a and another NR sidelink UE 720c may be referred to as an NR sidelink. The NR sidelink UE 720a may transmit sidelink control information and data information for NR sidelink communication to another NR sidelink UE 720c through the NR sidelink. Further, the NR sidelink UE 720a may receive sidelink control information and data information for NR sidelink communication from another NR sidelink UE 720c through the NR sidelink.

A link between the NR sidelink UE 720a and an LTE sidelink UE 720b may be referred to as an LTE sidelink. When the NR sidelink UE 720a has a capability for supporting LTE sidelink communication, the NR sidelink UE 720a may transmit or receive control information and data information for LTE sidelink communication through the LTE sidelink.

A downlink or an uplink between the NR sidelink UE 720a and an NR BS 710b may be referred to an NR Uu. The NR BS 710b may be referred to as a gNB.

The NR sidelink UE 720a may receive control information and data information related to NR sidelink transmission and reception from the gNB 710b through the NR Uu. The NR sidelink UE 720a may transmit NR sidelink control information and data information received from another NR sidelink UE 720c to the gNB through the NR Uu.

The NR sidelink UE 720a may receive control information and data information related to LTE sidelink transmission and reception from the NR BS 710b through the NR Uu. The NR sidelink UE 720a may transmit LTE sidelink control information and data information received from the LTE sidelink UE 720b to the gNB through the NR Uu. At this time, it may be assumed that the NR sidelink UE 720*a* has a capability of supporting LTE sidelink communication.

A downlink or an uplink between the NR sidelink UE 720*a* and an LTE BS 710*a* may be referred to an LTE Uu. The LTE BS 710*a* may be referred to as an eNB.

The NR sidelink UE 720*a* may receive control information and data information related to NR sidelink transmission and reception from the LTE BS 710*a* through the LTE Uu. The NR sidelink UE 720*a* may transmit NR sidelink control information and data information received from another NR sidelink UE 720*c* to the eNB 710*a* through the LTE Uu. At this time, it may be assumed that the NR sidelink UE 720*a* has a capability of supporting LTE Uu.

The NR sidelink UE 720*a* may receive control information and data information related to LTE sidelink transmission and reception from the LTE BS 710*a* through the LTE Uu. The NR sidelink UE 720*a* may transmit LTE sidelink control information and data information received from the LTE sidelink UE 720*b* to the LTE BS 710*a* through the LTE Uu. At this time, it may be assumed that the NR sidelink UE 720*a* has a capability of supporting LTE sidelink communication and a capability of supporting the LTE Uu.

Various links for the NR sidelink communication illustrated in FIG. 7 may be classified as shown in Table 1 according to the capability of the NR sidelink UE.

TABLE I

| Classification | Contents |
|---|---|
| Case 1 | NR UE supporting NR Uu and NR sidelink |
| Case 2 | NR UE supporting NR Uu, NR sidelink, and LTE Uu |
| Case 3 | NR UE supporting NR Uu, NR sidelink, and LTE sidelink |
| Case 4 | NR UE supporting LTE Uu, LTE sidelink, and NR sidelink |
| Case 5 | NR UE supporting NR Uu, NR sidelink, LTE Uu, and LTE sidelink |

Figure 8:
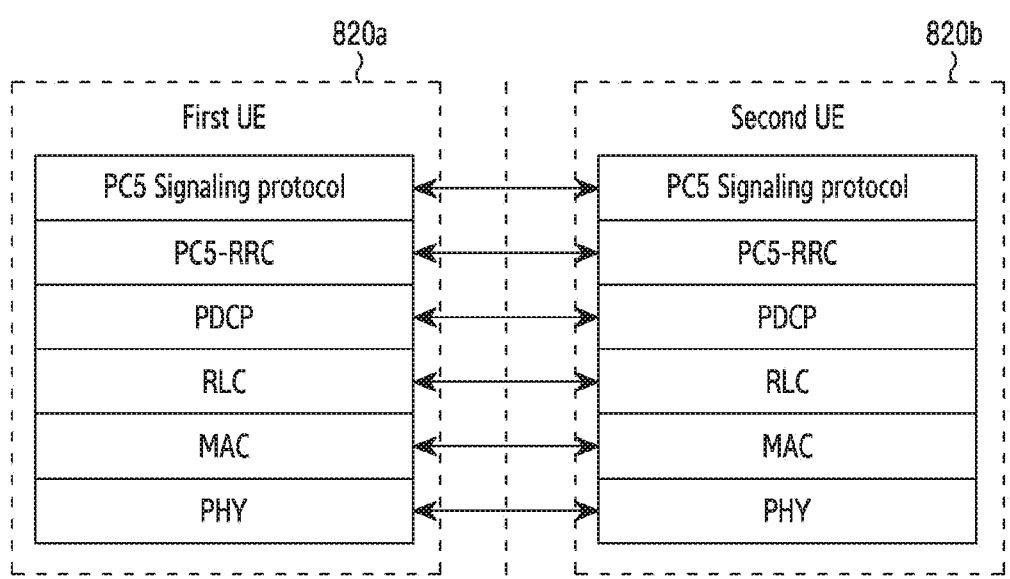
FIG. 8 illustrates an example of a protocol stack of a sidelink UE in a wireless communication system according to an embodiment of the disclosure.

FIG. 8 illustrates an example of a protocol stack of a sidelink UE in a wireless communication system according to an embodiment of the disclosure.

Referring to FIG. 8, application layers of a first UE 820*a* and a second UE 820*b* may perform service discovery. The service discovery may include discovery indicating which sidelink communication scheme (for example, unicast, groupcast, or broadcast) will be performed by each UE. Accordingly, in the example of FIG. 8, it may be assumed that the first UE 820*a* and the second UE 820*b* will perform a unicast communication scheme after performing a service discovery procedure in the application layers. The first UE 820*a* and the second UE 820*b* may acquire information on a source identifier (ID) and a destination identifier (ID) for sidelink communication through the service discovery procedure.

When the service discovery process is completed, a direct link setup procedure between UEs may be performed in PC-5 signaling protocol layers illustrated in FIG. 8. At this time, security configuration information for direct communication between the first UE 820*a* and the second UE 820*b* may be transmitted and received. When direct link connection setup is completed, a PC-5 Radio Resource Control (RRC) setup procedure may be performed in the PC-5 RRC layers of FIG. 8. At this time, UE capability information of the first UE 820*a* and the second UE 820*b* may be exchanged, and Access Stratum (AS) layer parameter information for unicast communication may be exchanged. When the PC-5 RRC establishment procedure is completed, the first UE 820*a* and the second UE 820*b* may perform unicast communication.

In the above example, although unicast communication is provided as an example, the communication may expand to groupcast communication. For example, when the first UE 820*a*, the second UE 820*b*, and a third UE, which is not illustrated in FIG. 8, perform groupcast communication, the first UE 820*a* and the second UE 820*b* may perform service discovery for unicast communication, the direct link setup between UEs, and the PC-5 RRC establishment procedure as described above. Further, the first UE 820*a* and the third UE may perform service discovery for unicast communication, the direct link setup between UEs, and the PC-5 RRC establishment procedure. Lastly, the second UE 820*b* and the third UE may perform service discovery for unicast communication, direct link setup between UEs, and the PC-5 RRC establishment procedure. That is, a pair of a transmission UE and a reception UE participating groupcast communication may perform the PC-5 RRC establishment procedure for unicast communication instead of performing a separate PC-5 RRC establishment procedure for groupcast communication.

The PC-5 RRC establishment procedure for unicast or groupcast communication may be performed by one of the in-coverage scenario, the partial-coverage scenario, or the out-of-coverage scenario illustrated in FIGS. 6A and 6B. When UEs which desire to perform unicast or groupcast communication exist within the coverage of the BS, the corresponding UEs may perform the PC-5 RRC establishment procedure before or after performing downlink or uplink synchronization with the BS.

Figure 9:
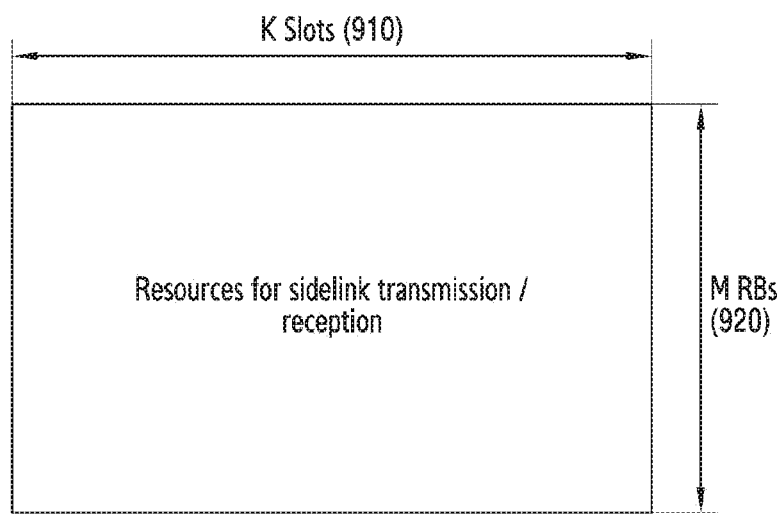
FIG. 9 illustrates an example of a sidelink resource pool in a wireless communication system according to an embodiment of the disclosure.

FIG. 9 illustrates an example of a sidelink resource pool in a wireless communication system according to an embodiment of the disclosure.

FIG. 9 illustrates one sidelink resource pool.

Referring to FIG. 9, the sidelink resource pool may include K slots 910 on a time axis and M Resource Blocks (RBs) 920 on a frequency axis. The M resource blocks 920 may form at least one Resource Block Group (RBG) or at least one subchannel. One slot may include one or more OFDM symbols and a maximum of 14 OFDM symbols. One resource block may include 12 subcarriers, and one resource block group may include m resource blocks. Similarly, one subchannel may include m resource blocks. A resource block may be referred to as a "frequency block".

According to an embodiment, one resource block group or one subchannel may be a minimum unit of sidelink resource allocation. That is, a sidelink transmission UE may transmit sidelink control information, sidelink data information, or sidelink feedback information through a minimum of one or more resource block groups or one subchannel. At this time, a resource block group or a subchannel for transmitting sidelink control information, a resource block group or a subchannel for transmitting and receiving sidelink data information, and a resource block group or a subchannel for transmitting and receiving sidelink feedback information may include different numbers of resource blocks. For example, one resource block group or subchannel for transmitting sidelink control information may include 2 resource blocks, and one resource block group or subchannel for transmitting sidelink data information may include 4 resource blocks. The resource block group or subchannel for transmitting sidelink feedback information may include 1 resource block.

According to an embodiment, sidelink UEs may perform sidelink transmission or reception through different numbers of resource block groups or subchannels. In other words, numbers of resource block groups or subchannels used by UEs using the same or different resource pools to transmit or receive sidelink data may be different. For example, a first UE may perform sidelink transmission or reception through two sidelink resource block groups or subchannels, and a second UE may perform sidelink transmission or reception through 4 sidelink resource block groups or subchannels.

The sidelink UE may acquire information on how many slots are included in one sidelink resource pool on a time axis and how many OFDM symbols are included in one slot, along with information on how many resource blocks (or resource block groups or subchannels) are included in the sidelink resource pool on a frequency axis and how many resource blocks are included in one resource block group (or subchannel). Information on the configuration of the sidelink resource pool, the slot, and the resource block may be acquired through at least one of the following methods:

Use a pre-configured value in the UE;
Configure a value in the UE through system information and RRC signaling from the BS;
Configure a value in the UE through PC-5 RRC signaling; and
Always use a fixed value (for example, one slot includes 14 OFDM symbols).

In the example of FIG. 9, K slots may be physically continuous on a time axis or logically continuous. When the K slots are logically continuous, the slots may be physically discontinuous. Similarly, M resources may be physically continuous frequency resource blocks on a frequency axis or may be logically continuous. When the M resource blocks are logically continuous, the resource blocks may be physically discontinuous.

Although not illustrated in FIG. 9, the sidelink transmission UE may use the sidelink resource pool of FIG. 9 in order to transmit sidelink control information or data information. In this case, the sidelink resource pool may be referred to as a transmission resource pool. Further, the sidelink reception UE may use the sidelink resource pool of FIG. 9 in order to receive sidelink control information or data information. In this case, the sidelink resource pool may be referred to as a reception resource pool. In another example, the sidelink reception UE may use the sidelink resource pool of FIG. 9 in order to transmit sidelink feedback information to the sidelink transmission UE, and the sidelink transmission UE may use the sidelink resource pool of FIG. 9 in order to receive feedback information. In this case, the sidelink resource pool may be referred to as a sidelink feedback resource pool.

The transmission resource pool and the reception resource pool may be independently configured or pre-configured. For example, the sidelink UE may configure a transmission resource pool including K1 slots and M1 resource blocks and a reception resource pool including K2 slots and M2 resource blocks, or may receive the configuration in advance. For example, K1≤K2 and M1≤M2. The transmission resource pool may be a subset of the reception resource pool.

In another example, the sidelink UE may configure one or more transmission resource pools or one or more reception resource pools, or may receive the configuration in advance in order to support various services. More specifically, when two transmission resource pools are configured or have been configured in advance, the first transmission resource pool may be used for sidelink unicast transmission, and the second transmission resource pool may be used for sidelink broadcast transmission. When two reception resource pools are configured or have been configured in advance, the first reception resource pool may be used for sidelink unicast reception and the second reception resource pool may be used for sidelink groupcast reception.

In another example, in spite of unicast transmission or reception, different transmission resource pools or reception resource pools may have been configured or may be configured in advance according to requirements such as the presence or absence of a sidelink feedback channel or a delay time (or latency) required for sidelink communication.

In the above examples, the number of transmission resource pools and the number of reception resource pools configured or configured in advance in the UE may be different.

Figure 10:
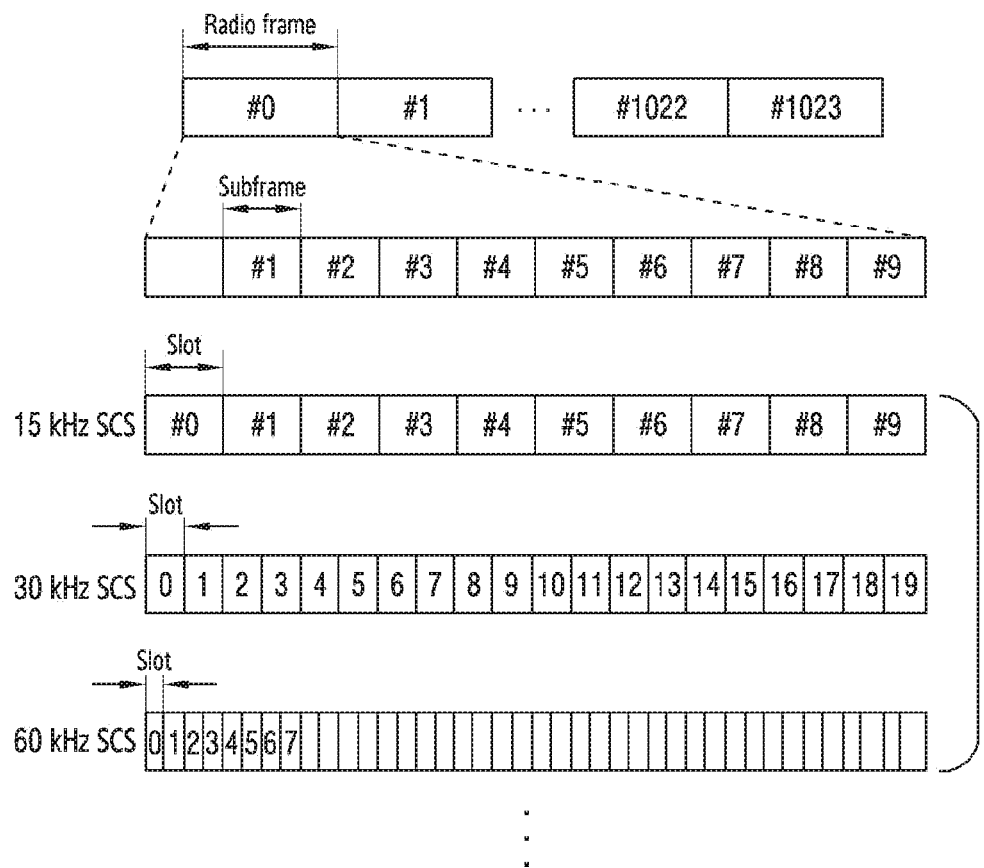
FIG. 10 illustrates an example of a sidelink frame structure in a wireless communication system according to an embodiment of the disclosure.

FIG. 10 illustrates an example of a sidelink frame structure in a wireless communication system according to an embodiment of the disclosure.

Although FIG. 10 illustrates that the system operates 1024 radio frames, the disclosure is not limited thereto. For example, a specific system may operate a greater or smaller number of radio frames than 1024 radio frames, and the number of radio frames operated by the system may be configured in the UE by the BS through a Master Information Block (MIB) transmitted through a Physical Broadcast Channel (PBCH), or may be a fixed value appointed with the UE. Alternatively, the number of operated radio frames may be configured from PC-5 RRC of the UE, or may be pre-configured.

Referring to FIG. 10, a radio frame number and a system frame number may be handled in the same manner. That is, radio frame number "0" may correspond to system frame number "0", and radio frame number "1" may correspond to system frame number "1". One radio frame may include ten subframes, and one subframe may have a length of 1 ms on a time axis.

The number of slots included in one subframe may vary depending on subcarrier spacing used for the sidelink, as illustrated in FIG. 10. For example, when sidelink communication uses subcarrier spacing of 15 kHz, one subframe may include one slot. However, when subcarrier spacing of 30 kHz and subcarrier spacing of 60 kHz are used, one subframe may include two slots and four slots, respectively. Although not illustrated in FIG. 10, this may be applied when subcarrier spacing of 120 kHz or more is used. That is, when the number of slots included in one subframe is generalized, the number of slots included in one subframe may increase to $2^n$ as subcarrier spacing increases to 15 kHz×$2^n$. At this time, n=0, 1, 2, 3, . . . .

Figure 11:
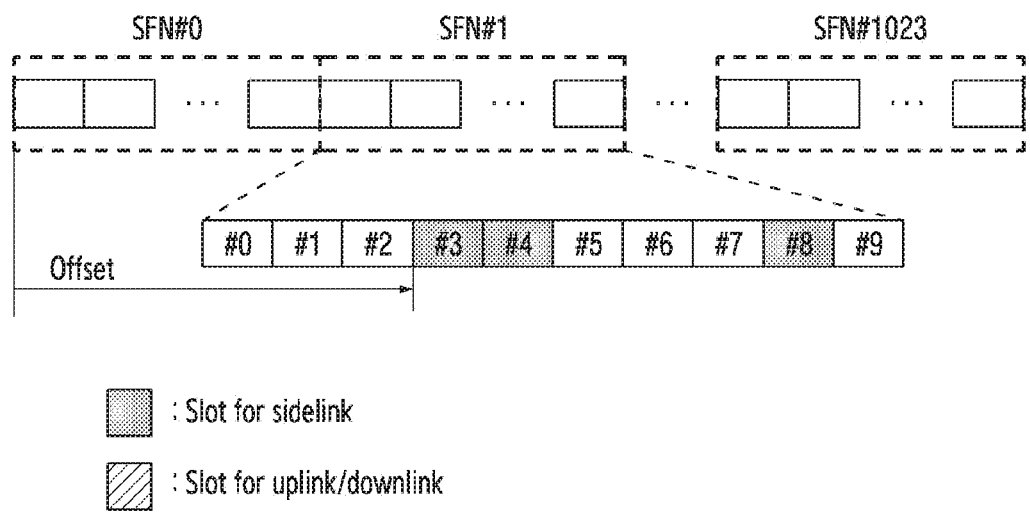
FIG. 11 illustrates an example of allocation of time-axis resources of a sidelink resource pool in a wireless communication system according to an embodiment of the disclosure.

FIG. 11 illustrates an example of allocation of time-axis resources of a sidelink resource pool in a wireless communication system according to an embodiment of the disclosure.

On a time axis, a sidelink resource pool may be a set of slots for transmitting and receiving sidelink control information, data information, and feedback information, and allocation of time-axis resources of the sidelink resource pool may be a start point and an end point of the set of slots for performing sidelink transmission and reception. Specifically, the start point of the sidelink resource pool may include a slot index or both a slot index and a symbol index within the corresponding slot.

FIG. 11 assumes a system using subcarrier spacing of 15 kHz (for example, one radio frame includes ten slots, as illustrated in FIG. 10), and a sidelink resource pool starts from slot index "3" of system frame "1" based on system frame number "0". Slots that can be used for sidelink transmission and reception starting at slot index "3" of system frame "1" may be indicated in the form of a bitmap. In the case of a Frequency Division Duplex (FDD) system, slot index "0" to slot index "9" may be uplink slots in FIG. 10. Through a bitmap (7 bits) of 1100010 based on slot index "3", "1" may be a sidelink slot and "0" may be an uplink slot (that is, slot index "3", slot index "4", and slot index "8" may be slots that can be used for sidelink transmission and reception). The bitmap of 7 bits may be repeated, and accordingly, sidelink slots may be expressed up to the last slot index of system frame number 1023. For example, in FIG. 10, (1024−2)×10+7=10227 slots may exist, and 10227 slots may be expressed through 1461 repetitions of the bitmap of 7 bits.

In another example, a bitmap of 8 bits may be used, and when a sidelink resource pool starts at slot index "3" of system frame number "1", 10227 slots may be expressed through 1278 repetitions of the bitmap of 8 bits. At this time, the three last slots cannot be expressed by the bitmap, and thus the corresponding slots may be excluded from the sidelink resource pool. Alternatively, it may be interpreted that slots corresponding to 3 bits in the front part of the 8-bit bitmap may be included in the sidelink resource pool. For example, when the bitmap of 8 bits corresponds to 10100111, "101" in the front part may be included in the sidelink resource pool (that is, slot index "7" and slot index "9" of system frame number 1023 are included in the sidelink resource pool).

In the above example, the bitmap of 7 bits or 8 bits is illustrated, but the disclosure is not limited thereto.

Meanwhile, in the case of a Time Division Duplex (TDD) system, slot index "0" to slot index "9" may be uplink slots or downlink slots in FIG. 10. In this case, downlink slots may not be reflected in the bitmap. For example, when slot index "6" and slot index "7" are downlink slots in FIG. 10, a bitmap for expressing sidelink slots may be 5 bits of 11010. Since the bitmap of 5 bits is repeated 2045 times and the two last slots cannot be expressed by the bitmap, it may be interpreted that the corresponding slots are excluded from the sidelink resource pool or that slots corresponding to 2 bits in the front part of the 5-bit bitmap are included in the sidelink resource pool.

In the above example, the bitmap of 5 bits is illustrated, but the disclosure is not limited thereto.

Figure 12:
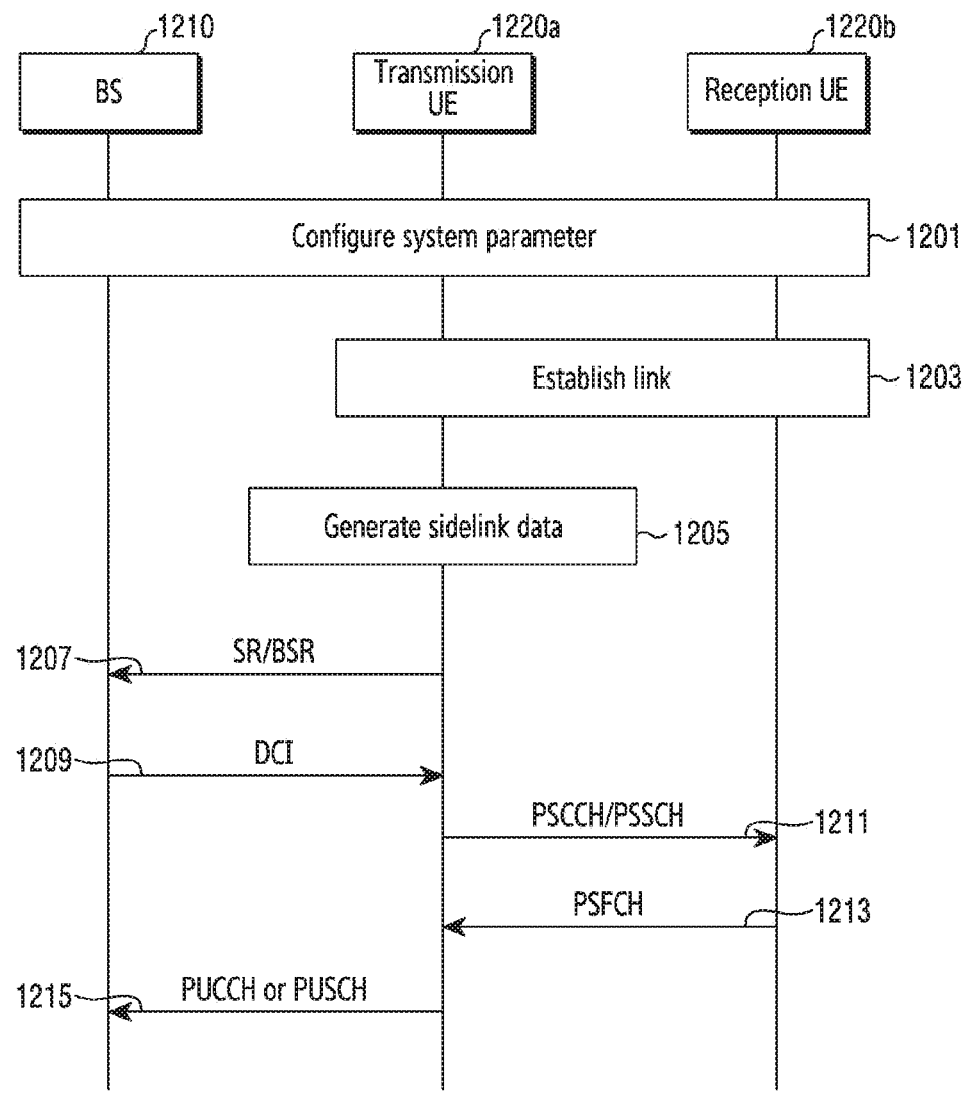
FIG. 12 illustrates a sidelink unicast communication procedure in a wireless communication system according to an embodiment of the disclosure.

FIG. 12 illustrates a sidelink unicast communication procedure in a wireless communication system according to an embodiment of the disclosure.

FIG. 12 illustrates signal exchange between a BS 1210, a transmission UE 1220a, and a reception UE 1220b according to a sidelink communication procedure based on resource allocation in mode 1.

Referring to FIG. 12, in operation 1201, the BS 1210 configures a system parameter. The BS 1210 may transmit a parameter for sidelink communication to the transmission UE 1220a and the reception UE 1220b within a cell through system information. The system information may include a System Information Block (SIB) and may be transmitted periodically or on demand. For example, the BS 1210 may transmit information on a sidelink Bandwidth Part (BWP) in which sidelink communication can be performed in its own cell and information on a sidelink resource pool which can be used for sidelink communication within the sidelink BWP.

At this time, the sidelink BWP may be configured independently from an uplink BWP (or a downlink BWP), or may be included in the uplink BWP (or the downlink BWP). When the sidelink BWP is included in the uplink BWP (or the downlink BWP), a center frequency of the sidelink BWP and a frequency bandwidth may be included in a frequency bandwidth of the uplink BWP (or the downlink BWP). Further, a sidelink resource pool within the sidelink BWP may refer to a transmission resource pool for sidelink transmission or a reception resource pool for sidelink reception.

Meanwhile, one sidelink BWP includes at least one sidelink resource pool, and a sidelink UE may receive a configuration of one or more resource pools from the BS. For example, the BS may configure unicast, groupcast, and broadcast communication to be transmitted or received in different resource pools through system information. For example, resource pool A may be used for unicast transmission and reception, resource pool B may be used for groupcast communication, and resource pool 3 may be used for transmission and reception of broadcast communication. In another example, the BS may configure unicast, groupcast, and broadcast communication to be performed in the same resource pool. At this time, different resource pools may be configured according to whether there are Physical Sidelink Feedback Channel (PSFCH) resources for transmitting sidelink feedback information in the resource pool. For example, resource pool A may be a pool in which there are PSFCH resources, and resource pool B may be a pool in which there is no PSFCH resource. At this time, transmission and reception of sidelink unicast and groupcast data that require Hybrid Automatic Repeat and Request (HARQ) feedback may use resource pool A, and transmission and reception of sidelink unicast and groupcast data and broadcast data that do not require HARQ feedback may use resource pool B.

Information on the sidelink resource pool configured by the BS, configured by PC-5 RRC, or pre-configured in the UE may include at least one of the items shown in Table 2 below.

TABLE 2

| Item | Contents |
| --- | --- |
| Information on time resources of a sidelink resource pool | Specifically, the information may include an index of a slot in which a Physical Sidelink Control Channel (PSCCH), a Physical Sidelink Shared Channel (PSSCH), and a Physical Sidelink Feedback Channel (PSFCH) are transmitted or an index of a slot in which a PSCCH, a PSSCH, and a PSFCH are transmitted and an index of a symbol within the corresponding slot. In addition, the information may include a period of resources through which the PSCCH, the PSSCH, and the PSFCH are transmitted |

TABLE 2-continued

| Item | Contents |
| --- | --- |
| Information on frequency resources of a sidelink resource pool | The information refers to information on a frequency axis in a resource pool in which a PSCCH, a PSSCH, and a PSFCH are transmitted and specifically may include an index of a resource block included in the resource pool or an index of a sub-channel including two or more resource blocks. |
| Information on whether sidelink HARQ-ACK is operated | (1) In the case in which sidelink HARQ-ACK is operated, at least one piece of the following information may be included.<br>(1-1) The number of maximum retransmissions<br>(1-2) HARQ-ACK timing: refers to a time from a time point at which the sidelink reception UE receives sidelink control information and data information from the sidelink transmission UE to a time point at which the sidelink reception UE transmits HARQ-ACK/NACK information to the sidelink transmission UE. A unit of time may be a slot or one or more OFDM symbols.<br>(1-3) A format of the PSFCH or an HARQ feedback method: when two or more PSFCH formats are operated, one PSFCH format may be used to transmit HARQ-ACK/NACK information of 1 bit or 2 bits. Another PSFCH format may be used to transmit HARQ-ACK/NACK information of 3 bits or more. Meanwhile, when the HARQ-ACK/NACK information is transmitted through the PSFCH, each of the ACK information and the NACK information may be transmitted through the PSFCH. When successfully decoding the PSSCH transmitted from the sidelink transmission UE, the sidelink reception UE may transmit ACK through the PSFCH. When failing in decoding, the sidelink reception UE may transmit NACK through the PSFCH. In another example, the sidelink reception UE may not transmit ACK when successfully decoding the PSSCH transmitted from the sidelink transmission UE, and may transmit NACK through the PSFCH only when failing in decoding. On the other hand, when one PSFCH format is operated, information on the HARQ feedback method (whether to transmit each of the ACK information and the NACK information through the PSFCH or to transmit only the NACK information through the PSFCH) may be included.<br>(1-4) A set of time/frequency/code resources included in the PSFCH: includes an index of a slot or a symbol in which the PSFCH is transmitted and a period in the case of time resources. In the case of frequency resources, the set of time/frequency/code resources may include a start point and an end point (or a start point and the length of frequency resources) of a sub-channel including a frequency Resource Block (RB) in which the PSFCH is transmitted or two or more successive blocks.<br>The sidelink transmission/reception UE may indirectly determine whether sidelink HARQ-ACK is operated through information indicating whether PSFCH resources are configured within the resource pool. For example, when at least one piece of the PSFCH-related information (time/frequency/code of the PSFCH), a maximum number of HARQ retransmissions, and HARQ timing resource information) is included in sidelink resource pool configuration information, the sidelink transmission/reception UE may determine that HARQ-ACK is operated in the corresponding sidelink resource pool. On the other hand, when no piece of the PSFCH-related information is included in sidelink resource pool configuration information, the sidelink transmission/reception UE may determine that HARQ-ACK is not operated in the corresponding sidelink resource pool. |
| Information on whether blind retransmission is operated | Blind retransmission may be repeated transmission by the transmission UE without reception of feedback information of ACK or NACK from the reception UE by the transmission UE, unlike HARQ-ACK/NACK-based retransmission. When the blind retransmission is operated, the number of blind retransmissions may be included in the resource pool information. For example, when the number of blind retransmissions is 4, the transmission UE may always transmit the same information four times when transmitting the PSCCH/PSSCH to the reception UE. At this time, an RV value may be included in SCI transmitted through the PSCCH. |

TABLE 2-continued

| Item | Contents |
|---|---|
| Information on a DMRS pattern which can be used by the PSSCH transmitted in the corresponding resource pool. | (1) A DMRS pattern that can be used by the PSSCH may vary depending on a UE speed. For example, when the speed is fast, it is required to increase the number of OFDM symbols used for DMRS transmission on the time axis in order to improve the accuracy of channel estimation. When the UE speed is slow, the accuracy of channel estimation can be guaranteed even though a small number of DMRS symbols is used, so it is required to decrease the number of OFDM symbols used for DMRS transmission on the time axis in order to reduce DMRS overhead. Accordingly, information on the resource pool may include information on a DMRS pattern that can be used for the corresponding resource pool. At this time, two or more DMRS patterns may be configured in one resource pool, and the sidelink transmission UE may select and use one DMRS pattern from the configured DMRS patterns according to a speed of the UE. Further, the sidelink transmission UE may transmit information on the DMRS pattern selected by the sidelink transmission UE itself to the sidelink reception UE through SCI of the PSCCH. The sidelink reception UE may receive the information, acquire DMRS pattern information, estimate a channel for the PSSCH, and acquire sidelink data information via a demodulation and decoding process. |
| Information on whether a sidelink Channel State Information Reference Signal (CSI-RS) is operated. | (1) In the case in which the sidelink CSI-RS is operated, at least one piece of the following information may be included. (1-2) CSI-RS transmission start time point: refers to a start time point at which the sidelink transmission UE transmits a CSI-RS to the sidelink reception UE. The start time point may refer to an index of a slot in which the CSI-RS is transmitted, an index of a symbol in which the CSI-RS is transmitted, or indexes of both the slot and the symbol. (1-2) CSI reporting timing: refers to a time point at which the sidelink reception UE receives a CSI-RS from the sidelink transmission UE, that is, a time point at which the sidelink reception UE transmits a CSI report to the sidelink transmission UE from a received slot index or an index of a symbol within the slot for reception, that is, a time up to an index of a slot in which the CSI report is transmitted or an index of a symbol within the slot for transmission. A unit of time may be a slot or one or more OFDM symbols. |
| A parameter for controlling sidelink transmission power | (1) A sidelink path attenuation estimation value may be needed to control sidelink transmission power. When a Uu carrier of the BS and a sidelink carrier are the same, sidelink transmission power may be controlled based on a downlink path attenuation estimation value in order to reduce interference in an uplink signal received by a receiving side of the BS through sidelink transmission. To this end, the BS may determine whether the side link transmission UE should configure a sidelink transmission power value based on the sidelink path attenuation estimation value, configure a sidelink transmission power value based on the downlink path attenuation estimation value, or configure a sidelink transmission power value in consideration of both the sidelink path attenuation estimation value and the downlink path attenuation estimation value. For example, when the BS configures an SSB or a downlink CSI-RS as a signal used for path attenuation estimation, the UE may configure the sidelink transmission power value based on the downlink path attenuation value. When the BS configure a Demodulation Reference Signal (DMRS) or a sidelink CSI-RS as a signal used for path attenuation estimation, the UE may configure the sidelink transmission power value based on the sidelink path attenuation value. (2) As described above, different transmission power parameters may be configured according to the signal used for path attenuation estimation. |

As shown in Table 2, information on parameters is included in the configuration of the resource pool for sidelink communication, but the disclosure is not limited thereto. That is, the information may be configured in a sidelink transmission UE or a sidelink reception UE independently from the configuration of the resource pool (for example, configured through different RRC parameters).

Further, when information on parameters is included in the configuration of the resource pool for sidelink communication, different parameters may be configured depending on a sidelink communication method supported in the corresponding resource pool. For example, when unicast and groupcast share the same resource pool, one resource pool configuration information may include both parameter configuration information for unicast and parameter configuration information for groupcast, and pieces of the parameter configuration information may be different from each other.

In operation 1203, the transmission UE 1220a and the reception UE 1220b establish a link. The transmission UE 1220a and the reception UE 1220b may transmit and receive at least one message for link setup. Through operation 1203, the transmission UE 1220a and the reception UE 1220b may acquire at least one of a source ID or a destination ID. For example, the transmission UE 1220a and the reception UE 1220b may perform the PC-5 RRC setup procedure described with reference to FIG. 8.

In operation 1205, the transmission UE 1220a recognizes the generation of sidelink data. The sidelink data may be generated by an application layer and transmitted to a lower layer. Content included in the sidelink data may vary depending on the application being executed. For example, when an application related to a vehicle is being executed, sidelink data may include information indicating a driving/operation state of the vehicle, information indicating a result of sensing an environment around the vehicle, information of making a request for a specific operation to another vehicle, and information on a warning provided to neighboring vehicles or pedestrians.

In operation 1207, the transmission UE 1220a transmit a Scheduling Request (SR) and/or a Buffer Status Report (BSR) to the BS 1210. The transmission UE 1220a may make a request for sidelink resources for sidelink data to be transmitted to the reception UE 1220b through the SR and/or the BSR.

In operation 1209, the BS 1210 transmits Downlink Control Information (DCI) to the transmission UE 1220a. The BS 1210 receiving the SR and/or BSR may identify that the transmission UE 1220a has data for sidelink transmission, determine resources required for sidelink transmission based on the SR and/or BSR, and transmit control information indicating the determined resources. For example, the BS 1210 may transmit a sidelink scheduling grant including at least one piece of resource information for Sidelink Control Information (SCI) transmission, resource information for sidelink data transmission, and resource information for sidelink feedback information to the transmission UE 1220a.

The sidelink scheduling grant is information for granting dynamic scheduling in the sidelink, and may be DCI transmitted through a Physical Downlink Control Channel (PDCCH). When the BS 1210 is an NR BS, the sidelink scheduling grant may include information indicating a BWP in which sidelink transmission is performed and a Carrier Indicator Field (CIF) indicating a carrier through which sidelink transmission is performed or a carrier frequency indicator. When the BS 1210 is an LTE BS, the sidelink scheduling grant may include a CIF. Further, the sidelink scheduling grant may further include feedback information of sidelink data, that is, resource-allocation-related information of the PSFCH in which Acknowledgement (ACK)/Negative ACK (NACK) information is transmitted. When sidelink transmission is groupcast, the resource allocation information may include information for allocating a plurality of PSFCH resources to a plurality of UEs within a group. Further, the resource-allocation-related information of feedback information may be information indicating at least one of a plurality of feedback information resource candidate sets configured through higher-layer signaling. In operation 1211, the transmission UE 1220a transmits a PSCCH/PSSCH to the reception UE 1220b. The transmission UE 1220a receiving the sidelink scheduling grant transmits SCI for scheduling sidelink data according to the sidelink scheduling grant to the reception UE 1220b through the PSCCH and transmits the sidelink data through the PSSCH. The reception UE 1220b receiving the SCI may receive the sidelink data transmitted through the PSSCH.

The SCI may include at least one of resource allocation information used for sidelink data transmission, Modulation and Coding Scheme (MCS) information applied to sidelink data, group destination ID information, transmitter ID (source ID) information, unicast destination ID information, power control information for controlling sidelink power, Timing Advance (TA) information, DMRS configuration information for sidelink transmission, repeated packet transmission-related information, for example, information on the number of repeated packet transmissions, information on resource allocation when packets are repeatedly transmitted, a Redundancy Version (RV), or an HARQ process ID. The SCI may further include feedback information for sidelink data, that is, information indicating resources through which ACK/NACK information is transmitted.

In operation 1213, the reception UE 1220b transmits a PSFCH. The reception UE 1220b transmits ACK/NACK information indicating whether decoding of sidelink data is successful or fails to the transmission UE 1220a through the PSFCH. Transmission of feedback information of the sidelink may be applied to unicast transmission or groupcast transmission, but the disclosure does not exclude broadcast transmission. When sidelink transmission corresponds to groupcast transmission, respective UEs receiving groupcast data may transmit feedback information through different PSFCH resources. Alternatively, respective UEs receiving groupcast data may transmit feedback information through the same PSFCH resources. In this case, only NACK information may be fed back. That is, in the case of ACK, the UE receiving data may not transmit feedback. At this time, PSFCH resources may include not only resources distinguished in time or/and frequency domains but also resources distinguished using code such as scrambling code or orthogonal cover code, and resources distinguished using different sequences and cyclic shift applied to the sequence.

In operation 1215, the transmission UE 1220a transmits a Physical Uplink Control Channel (PUCCH) or a Physical Uplink Shared Channel (PUSCH) to the BS 1210. The transmission UE 1220a reports HARQ feedback to the BS 1210 through the PUCCH or the PUSCH. The BS 1210 may configure the report on the HARQ feedback which the transmission UE 1220a received from the reception UE 1220b through system information or RRC. In this case, the transmission UE 1220a may transmit the sidelink HARQ feedback received from the reception UE 1220b to the BS 1210 through the PUCCH or the PUSCH. In addition, the BS 1210 may configure whether the transmission UE 1220a multiplexes and transmits the sidelink HARQ feedback information received from the reception UE 1220b and Uplink Control Information (UCI) of the Uu of the related art.

When the BS 1210 configures transmission of the sidelink HARQ feedback to the BS 1210 through the PUCCH and does not configure multiplexing of the sidelink HARQ feedback information and the UCI, the transmission UE 1220a cannot multiplex the sidelink HARQ feedback information and the UCI for the Uu to transmit them through one PUCCH. In this case, the BS 1201 may configure a PUCCH for transmitting sidelink HARQ feedback information independently from a PUCCH for transmitting UCI. That is, the PUCCH for transmitting the sidelink HARQ feedback information may exist independently, and any UCI can be transmitted in the corresponding PUCCH.

Unlike this, when the BS 1210 configures transmission of the sidelink HARQ feedback to the BS 1210 through the PUCCH and configures multiplexing of the sidelink HARQ feedback information and the UCI, the transmission UE 1220a may multiplex the sidelink HARQ feedback information and the UCI to transmit the same through one PUCCH. When it is assumed that the sidelink HARQ feedback information is N1 bits and UCI is N2 bits, the order of multiplexing may follow N2+N1. That is, the sidelink HARQ feedback information may be multiplexed after the UCI. When a code rate of a sum of sidelink HARQ feedback bits and UCI bits multiplexed and transmitted through the corresponding PUCCH is larger than a code rate configured by the BS 1210, the transmission UE 1220a may give up transmission of the sidelink HARQ feedback information. In other words, the transmission UE 1220a may drop the sidelink HARQ feedback information. In another example, the order of multiplexing may follow N1+N2. That is, the sidelink HARQ feedback information may be multiplexed after the UCI. At this time, when a code rate of N1+N2 is larger than a code rate configured by the BS 1210, the transmission UE 1220a may give up transmission of the UCI. In other words, the transmission UE 1220a may drop the UCI.

In another example, whether the transmission UE 1220a gives up transmission of the sidelink HARQ feedback information or transmission of the UCI may be determined based on priority. At this time, the priority may follow a preset rule according to the type of UCI. For example, the rule may be defined such that HARQ feedback information of downlink data has a higher priority than sidelink HARQ feedback information. The rule may be defined such that feedback information of downlink CSI has a lower priority than sidelink HARQ feedback information. In this case, the transmission UE 1220a may give up transmission of information having a lower priority.

In another example of the priority, dropping of the sidelink HARQ feedback information or dropping of the UCI may be determined according to a priority index configured by a higher layer. For example, the transmission UE 1220a may receive a priority index of sidelink data information corresponding to sidelink HARQ feedback information from a higher layer and receive a priority index of downlink UCI from a higher layer. The transmission UE 1220a may compare the priority indexes and give transmission of information having a lower priority.

FIG. 12 assumes a scenario in which the transmission UE 1220a establishes an uplink connection with the BS 1210, that is, in an RRC-connected state, and both the transmission UE 1220a and the reception UE 1220b exist within the coverage of the BS 1210. Although not illustrated in FIG. 12, when the transmission UE 1220a has not established the uplink connection with the BS 1210, that is, in an RRC-idle state, the transmission UE 1220a may perform a random access procedure for establishing the uplink connection with the BS 1210. Although not illustrated in FIG. 12, the reception UE 1220b may receive in advance a configuration of information for sidelink communication to use the same in a scenario in which the transmission UE 1220a exists within the coverage of the BS 1210 and the reception UE 1220b exists outside the coverage of the BS 1210.

Meanwhile, the transmission UE 1220a may receive a configuration of information for sidelink communication from the BS 1210 as illustrated in FIG. 12. When both the transmission UE 1220a and the reception UE 1220b exists outside the coverage of the BS 1210, the transmission UE 1220a and the reception UE 1220b may receive a configuration of information for sidelink communication in advance to use the same. At this time, reception of the configuration in advance may be interpreted as using a value embedded into the UE when the UE is released. In another example, when the transmission UE 1220a or the reception UE 1220b accesses the BS 1210 and acquires information on sidelink communication in advance through the RRC setup or has acquired information on sidelink communication through system information of the BS 1210, reception of the configuration in advance may mean the most recently acquired information.

Although not illustrated in FIG. 12, the transmission UE 1220a and the reception UE 1220b may complete the service discovery with the sidelink reception UE described with reference to FIG. 8, a direct link connection setup procedure between UEs, and a PC-5 RRC setup procedure (for example, operation 1203) before an operation (for example, operation 1201) of configuring system parameters from the BS 1210. That is, operation 1203 may be performed before operation 1201.

FIG. 12 is an example of sidelink unicast communication for only one sidelink reception UE, but may be applied to sidelink groupcast communication and sidelink broadcast communication for a plurality of sidelink reception UEs. However, in the case of sidelink broadcast communication, the procedure in which the reception UE transmits the PSFCH to the transmission UE or the procedure in which the transmission UE transmits the PUCCH or the PUSCH to the BS may be omitted.

Meanwhile, in case 3) illustrated above with reference to FIG. 7, the NR BS (for example, the gNB) may control both the NR sidelink and the LTE sidelink. More specifically, an NR serving cell may support both the NR sidelink and the LTE sidelink, and an NR UE may have a capability for supporting both the LTE sidelink and the NR sidelink. The UE may be in an RRC-connected state with the NR BS, and may make a request for sidelink resources to the BS as illustrated in FIG. 12. At this time, the sidelink resource requested by the UE may be LTE sidelink resources or NR sidelink resources. The BS receiving information on the sidelink resource request from the UE may configure Semi-Persistent Scheduling (PSP) resources for LTE sidelink and NR sidelink transmission through RRC. Further, the BS may transmit a command for activating or releasing the SPS resources configured through RRC to the sidelink UE through DCI. In such a scenario, the sidelink UE should identify whether the DCI that the UE received from the BS means activation/release of SPS resources for NR sidelink transmission or activation/release of SPS resources for LTE sidelink transmission. At least one of the methods of Table 3 below may be used for identification by the sidelink UE.

TABLE 3

| Method | Contents |
|---|---|
| Use different DCI contents | A 1-bit field indicating a type of a Radio Access Technology (RAT) may be added to DCI information for controlling an NR sidelink. The sidelink UE receiving the DCI information may identify whether the corresponding DCI indicates activation/release of SPS resources for NR sidelink transmission or activation/release of SPS resources for LTE sidelink transmission. For example, "0" may indicate an LTE sidelink, and "1" may indicate an NR sidelink. In another example, the number of bits of a CIF may increase in NR DCI information. For example, when a CIF of 4 bits is assumed, a first bit or a last fourth bit may denote a RAT type, and the remaining three bits may denote an index of a carrier used for the NR sidelink or the LTE sidelink. |
| Use different RNTIs | The BS may configure SPS-V-RNTI-UTE and SPS-V-RNTI-NR for the LTE sidelink and the NR sidelink, respectively. The sidelink UE receiving DCI may attempt DCI detection through SPS-V-RNTI-LTE and SPS-V-RNTI-NR, and the DCI detected through SPS-V-RNTI-LTE may be analyzed as DCI indicating activation/release of SPS resources for LTE sidelink transmission. The DCI detected through SPS-V-RNTI-NR may be analyzed as DCI indicating activation/release of SPS resources for NR sidelink transmission. |
| Use different SPS configuration indexes through RRC configuration | For example, it may be assumed that the BS configures five SPS configurations in the UE, and two SPS configurations are used for the NR sidelink and the remaining three SPS configurations are used for the LTE sidelink. In the example, indexes 0, 1, and 2 may indicate the SPS configuration for the LTE sidelink, and indexes 3 and 4 may indicate the SPS configuration for the NR sidelink. On the other hand, indexes 0 and 1 may indicate the SPS configuration for the NR sidelink, and indexes 2, 3, and 4 may indicate the SPS configuration for the LTE sidelink. Which index indicates the SPS configuration for the NR sidelink or the LTE sidelink may be pre-appointed between the UE and the BS. In a generalized form thereof, among a total of N sidelink SPS configurations, NI may indicate the SPS configuration of the NR sid elink and N2 may indicate the SPS configuration of the LTE sidelink (N = N1 + N2). At this time, indexes from 0 to N1-1 may indicate the SPS configuration of the NR sidelink, and indexes from N1 to N2-1 may indicate the SPS configuration of the LTE sidelink (and vice versa). The BS may transmit index information to the sidelink UE through DCI, and the UE receiving the index information may determine whether to apply the corresponding DCI to the NR sidelink or the LTE sidelink according to the acquired SPS index information. For example, when index 0 is included in the DCI received by the sidelink UE, the sidelink UE may apply the corresponding DCI to activation/release of the NR sidelink SPS. |

Meanwhile, the UE supporting case 3) defined in Table 1 above may have both a modem for supporting the NR sidelink and a modem for supporting the LTE sidelink. At this time, as described above, when the sidelink UE receives DCI for controlling the LTE sidelink from the BS, the sidelink UE may be required to determine when a command of a DCI field should be executed based on the time point at which the corresponding DCI is received. For example, a fixed time point (that is, 4 ms) may be applied, and more specifically, the UE receiving DCI from the NR BS in slot "n" may perform LTE sidelink transmission in an LTE subframe 4 ms after slot "n". However, there may be a delay time in an interface existing between the NR sidelink modem and the LTE sidelink modem or the time between the two modems may not be synchronized. Accordingly, there may be no LTE subframe 4 ms after slot "n". In this case, the UE may perform sidelink transmission in an LTE sidelink subframe which may be located first after 4 ms.

Depending on circumstances, the LTE sidelink subframe which is first located may appear after dozens of ms (for example, after 10 ms). In this case, the UE cannot avoid unnecessarily storing corresponding information to process the received DCI. In order to prevent the inefficient use of memory, the UE may operate with an offset from reception of the DCI from the BS to the LTE sidelink subframe to which the corresponding DCI is applied. More specifically, when the offset is 10 ms, the UE may determine whether there is an LTE sidelink subframe from reception of the DCI to the offset (10 ms). When there is an LTE sidelink subframe within the offset, the UE may transmit LTE sidelink control information and data information in the LTE sidelink subframe based on the DCI information received from the BS. On the other hand, when there is no LTE sidelink subframe within the offset, the UE may drop the DCI information received from the BS. That is, the UE may delete the DCI information from the memory without storing the DCI information in the memory any longer. However, the operation may cause abandonment of transmission of the LTE sidelink through dropping of the DCI information according to a configuration of an offset value and a pattern of LTE sidelink traffic. For example, when a generation period of LTE sidelink traffic is long and an offset value is short, transmission and reception of LTE sidelink data may not be smooth due to frequent DCI dropping. Accordingly, the BS may insert an LTE sidelink subframe index to which the sidelink UE should apply the corresponding DCI information into the DCI and then transmit the DCI. The sidelink UE receiving the DCI may perform LTE sidelink transmission in the LTE sidelink subframe index indicated by the corresponding DCI. In another example, the BS may insert an offset with an LTE sidelink subframe to which the sidelink UE should apply an NR slot for receiving DCI and corresponding DCI information into the DCI and then transmit the DCI. The sidelink UE receiving the DCI may perform LTE sidelink transmission in the LTE sidelink subframe located the offset after, the offset being indicated by the DCI.

Figure 13:
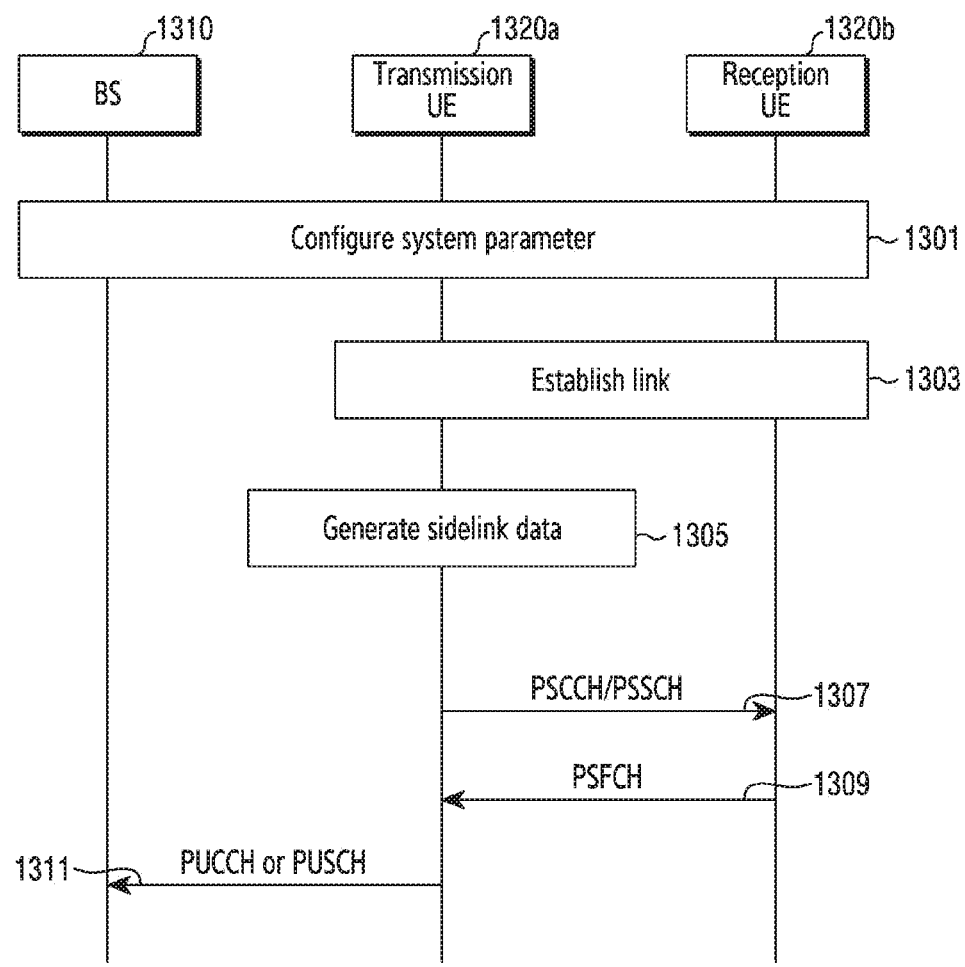
FIG. 13 illustrates another example of the unicast communication procedure in a wireless communication system according to an embodiment of the disclosure.

FIG. 13 illustrates another example of the unicast communication procedure in a wireless communication system according to an embodiment of the disclosure.

FIG. 13 illustrates signal exchange between a BS 1310, a transmission UE 1320*a*, and a reception UE 1320*b* according to a sidelink communication procedure based on resource allocation in mode 2.

Referring to FIG. 13, in operation 1301, the BS 1310 configures a system parameter. The BS 1310 may transmit a parameter for sidelink communication to the transmission UE 1320*a* and the reception UE 1320*b* within a cell through system information. The system information may include an SIB, and may be transmitted periodically or on demand. The parameter may include at least one of the parameters shown in Table 2. For example, the BS 1310 may configure a sidelink BWP and one or more sidelink resource pools included in the sidelink BWP through system information. At this time, the sidelink BWP may be configured independently from an uplink BWP (or a downlink BWP), or may be included in the uplink BWP. When the sidelink BWP is included in the uplink BWP (or the downlink BWP), a center frequency of the sidelink BWP and a frequency bandwidth may be included in a frequency bandwidth of the uplink BWP (or the downlink BWP).

In operation 1303, the transmission UE 1320*a* and the reception UE 1320*b* establish a link. The transmission UE 1320*a* and the reception UE 1320*b* may transmit and receive at least one message for a link setup. Through operation 1303, the transmission UE 1320*a* and the reception UE 1320*b* may acquire at least one of a source ID or a destination ID. For example, the transmission UE 1320*a* and the reception UE 1320*b* may perform the PC-5 RRC setup procedure described with reference to FIG. 8.

Although not illustrated in FIG. 13, the transmission UE 1320*a* and the reception UE 1320*b* may complete the service discovery with the sidelink reception UE described with reference to FIG. 8, a direct link connection setup procedure between UEs, and a PC-5 RRC setup procedure (for example, operation 1303) before an operation (for example, operation 1301) of configuring system parameters from the BS 1310. That is, operation 1303 may be performed before operation 1301.

In operation 1305, the transmission UE 1320*a* recognizes the generation of sidelink data. The sidelink data may be generated by an application layer, and may be transmitted to a lower layer. The content included in the sidelink data may vary depending on the application being executed. For example, when an application related to a vehicle is being executed, sidelink data may include information indicating a driving/operation state of the vehicle, information indicating the result of sensing an environment around the vehicle, information of making a request for a specific operation to another vehicle, and information on a warning provided to a neighboring vehicle or pedestrian.

In operation 1307, the transmission UE 1320*a* transmits a PSCCH/PSSCH to the reception UE 1320*b*. The transmission UE 1320*a* receiving the sidelink scheduling grant transmits SCI for scheduling sidelink data according to the sidelink scheduling grant to the reception UE 1320*b* through the PSCCH and transmits the sidelink data through the PSSCH. The reception UE 1320*b* receiving the SCI may receive the sidelink data transmitted through the PSSCH. The SCI may include at least one of resource allocation information used for sidelink data transmission, MCS information applied to sidelink data, source ID information, unicast destination ID information, power control information for controlling sidelink power, timing advance information DMRS configuration information for sidelink transmission, information related to packet repetitive transmission, for example, information on the number of repetitive packet transmissions, information related to resource allocation when packet is repeatedly transmitted, an RV, or a HARQ process ID. The SCI may further include feedback information for sidelink data, that is, information indicating resources through which ACK/NACK information is transmitted.

In operation 1309, the reception UE 1320*b* transmits a PSFCH. The reception UE 1320*b* transmits ACK/NACK information indicating whether decoding of sidelink data is successful or fails to the transmission UE 1320*a* through the PSFCH. Transmission of feedback information of the sidelink may be applied to unicast transmission or groupcast transmission, but the disclosure does not exclude broadcast transmission. When the sidelink transmission corresponds to groupcast transmission, respective UEs receiving groupcast data may transmit feedback information through different PSFCH resources. Alternatively, respective UEs receiving groupcast data may transmit feedback information through the same PSFCH resources. In this case, only NACK information may be fed back. That is, in the case of ACK, the UE receiving data may not transmit feedback. At this time, PSFCH resources may include not only resources distinguished in time or/and frequency domains but also resources distinguished using code such as scrambling code or orthogonal cover code, and resources distinguished using different sequences and cyclic shift applied to the sequence.

In operation 1311, the transmission UE 1320*a* transmits a PUCCH or a PUSCH to the BS 1310. The transmission UE 1320*a* reports HARQ feedback to the BS 1310 through the PUCCH or the PUSCH. The BS 1310 may configure the report on the HARQ feedback which the transmission UE 1320*a* received from the reception UE 1320*b* through system information or RRC. In this case, the transmission UE 1320*a* may transmit the sidelink HARQ feedback received from the reception UE 1320*b* to the BS 1320 through the PUCCH or the PUSCH. In addition, the BS 1310 may configure whether the transmission UE 1320*a* multiplexes and transmits the sidelink HARQ feedback information received from the reception UE 1320*b* and UCI of the Uu of the related art.

When the BS 1310 configures transmission of the sidelink HARQ feedback to the BS 1310 through the PUCCH and does not configure multiplexing of the sidelink HARQ feedback information and the UCI, the transmission UE 1320*a* cannot multiplex the sidelink HARQ feedback information and the UCI for the Uu to transmit the same to one PUCCH. In this case, the BS 1310 may configure a PUCCH for transmitting sidelink HARQ feedback information independently from a PUCCH for transmitting UCI. That is, the PUCCH for transmitting the sidelink HARQ feedback information may exist independently, and any UCI can be transmitted in the corresponding PUCCH.

Unlike this, when the BS 1310 configures transmission of the sidelink HARQ feedback to the BS 1310 through the PUCCH and configures multiplexing of the sidelink HARQ feedback information and the UCI, the transmission UE 1320*a* may multiplex the sidelink HARQ feedback information and the UCI to transmit the same to one PUCCH. When it is assumed that the sidelink HARQ feedback information is N1 bits and UCI is N2 bits, the order of multiplexing may follow N2+N1. That is, the sidelink HARQ feedback information may be multiplexed after the UCI. When a code rate of a sum of sidelink HARQ feedback bits and UCI bits multiplexed and transmitted through the corresponding PUCCH is larger than a code rate configured by the BS 1310, the transmission UE 1320a may not give up on transmission of the sidelink HARQ feedback information. In other words, the transmission UE 1320a may drop the sidelink HARQ feedback information. In another example, the order of multiplexing may follow N1+N2. That is, the sidelink HARQ feedback information may be multiplexed after the UCI. At this time, when a code rate of N1+N2 is larger than a code rate configured by the BS 1310, the transmission UE 1320a may give up on transmission of the UCI. In other words, the transmission UE 1320a may drop the UCI.

In another example, whether the transmission UE 1320a gives up transmission of the sidelink HARQ feedback information or transmission of the UCI may be determined based on priority. At this time, the priority may follow a preset rule according to the type of UCI. For example, the rule may be defined such that HARQ feedback information of downlink data has a higher priority than sidelink HARQ feedback information. The rule may be defined such that feedback information of downlink CSI has a lower priority than sidelink HARQ feedback information. In this case, the transmission UE 1320a may give up transmission of information having a lower priority.

In another example of the priority, dropping of the sidelink HARQ feedback information or dropping of the UCI may be determined according to a priority index configured by a higher layer. For example, the transmission UE 1320a may receive a priority index of sidelink data information corresponding to sidelink HARQ feedback information from a higher layer and receive a priority index of downlink UCI from a higher layer. The transmission UE 1320a may compare the priority indexes and give up on transmission of information having a lower priority.

FIG. 13 assumes a scenario in which both the transmission UE 1320a and the reception UE 1320b exist within the coverage of the BS 1310. Although not illustrated in FIG. 13, the reception UE 1320b may receive in advance a configuration of information for sidelink communication to use the same in a scenario in which the transmission UE 1320a exists within the coverage of the BS 1310 and the reception UE 1320b exists outside the coverage of the BS 1310.

The "information for sidelink communication" may be understood as information on at least one of the parameters for sidelink communication described with reference to FIG. 12. In the example, reception of the configuration in advance may be interpreted as using a value embedded into the UE when the UE is released. In another example, when the transmission UE 1320a or the reception UE 1320b accesses the BS 1310 and acquires information on sidelink communication in advance through the RRC setup or has acquired information on sidelink communication through system information of the BS 1310, reception of the configuration in advance may mean the most recently acquired information.

FIG. 13 illustrates sidelink unicast communication for only one sidelink reception UE but may be applied to sidelink groupcast communication and sidelink broadcast communication for a plurality of reception UEs. However, in the case of sidelink broadcast communication, the procedure in which the reception UE transmits the PSFCH to the transmission UE or the procedure in which the transmission UE transmits the PUCCH or the PUSCH to the BS may be omitted.

As described above, sidelink communication may be performed between two or more UEs. The UE transmitting sidelink data uses resources within a resource pool for the sidelink. According to various embodiments, the BS may configure at least one sidelink BWP, and may configure a single sidelink resource pool or a plurality of sidelink resource pools within the configured sidelink BWP. For example, in order to support higher reliability and a higher data transmission rate, a plurality of resource pools for sidelink communication may be configured. When a plurality of sidelink resource pools are configured within one BWP, the sidelink transmission UE may perform an operation for selecting one sidelink resource pool. This is because it is not preferable that the sidelink transmission UE simultaneously performs two or more sidelink transmissions in a frequency or a carrier in which sidelink communication is allowed.

As described above, configuration information of the sidelink resource pool may include information on a set of slots in which sidelink transmission is possible on a time axis. When the sidelink transmission UE should perform transmission in two sidelink resource pools (for example, resource pool A and resource pool B), at least one of the sidelink slots included in resource pool A and the sidelink slots included in resource pool B may overlap at the same time point. In this case, the UE should distribute transmission power to sidelink signal transmission in resource pool A and sidelink signal transmission in resource pool B. Due to distribution of transmission power, the coverage of the sidelink may be reduced in comparison with single sidelink transmission.

In order to solve a coverage reduction problem, when two or more sidelink resource pools are configured, the transmission UE may select a resource pool including resources located first on a time axis after the corresponding time point. When sidelink resources of the selected resource pool (for example, resource pool A) overlaps sidelink resources of another resource pool (for example, resource pool B) on a time axis, the UE may give up on transmission of sidelink control information and data information or feedback information transmitted in resource pool B. Alternatively, the UE may give up on sidelink transmission in a resource pool having a lower priority based on a priority provided by a higher layer. In the case of the same priority, the UE may randomly select transmission of sidelink control information and data information or feedback information. In another example, when the UE starting sidelink transmission in resource pool A has sidelink control information and data information or feedback information to be transmitted in resource pool B, the UE may place a higher priority on sidelink transmission in the resource pool in which transmission starts. However, the above-described schemes are not preferable since frequency dropping of sidelink transmission may be generated according to the configuration of sidelink resources of different resource pools. Accordingly, sidelink transmission may be simultaneously performed through different carriers (Carrier Aggregation (CA)), but two or more simultaneous sidelink transmissions may not be preferable.

Therefore, when the BS configures two or more resource pools in one carrier, the UE according to various embodiments may select one resource pool. When two or more resource pools are configured, the UE attempting to transmit sidelink data may operate as illustrated in FIG. 14 below.

Figure 14:
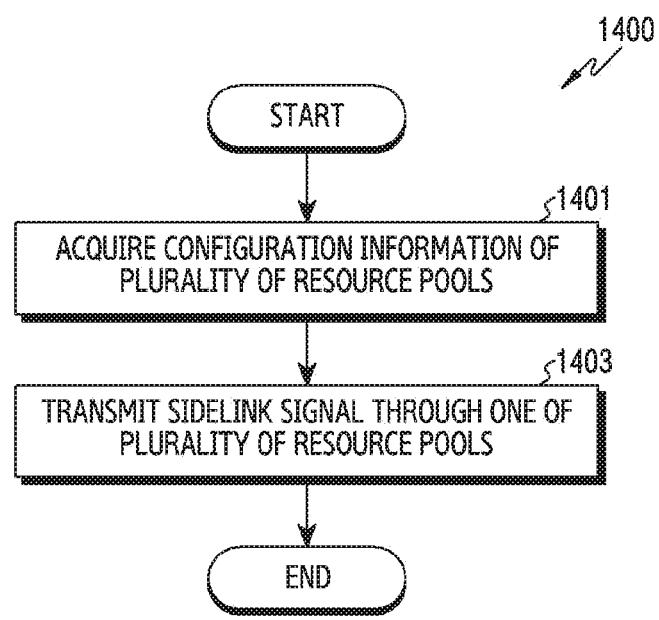
FIG. 14 is a flowchart illustrating a process in which a UE transmits and receives a sidelink signal in a wireless communication system according to an embodiment of the disclosure.

FIG. 14 is a flowchart 1400 of a UE for transmitting a sidelink signal in a wireless communication system according to an embodiment of the disclosure.

FIG. 14 illustrates a method of operating the UE 120 or the UE 130.

Referring to FIG. 14, in operation 1401, the UE acquires configuration information of a plurality of resource pools. The configuration information of resource pools may be acquired through system information. For example, the configuration information of resource pools may include at least one of the items listed in Table 2. The plurality of resource pools may be included in one BWP.

In operation 1403, the UE transmits a sidelink signal through one of the plurality of resource pools. The UE may select one of the resource pools included in the same BWP and transmit a sidelink signal through resources within the selected resource pool. According to various embodiments, the UE may select a resource pool in consideration of at least one of a characteristic of sidelink data or service (Quality of Service (QoS) requirements, whether HARQ feedback is needed, or a communication type), a characteristic of a resource pool (for example, an index, resource distribution, or a congestion level), a channel quality (for example, a channel quality between a BS and a UE or a channel quality between UEs), or a UE state.

Figure 15:
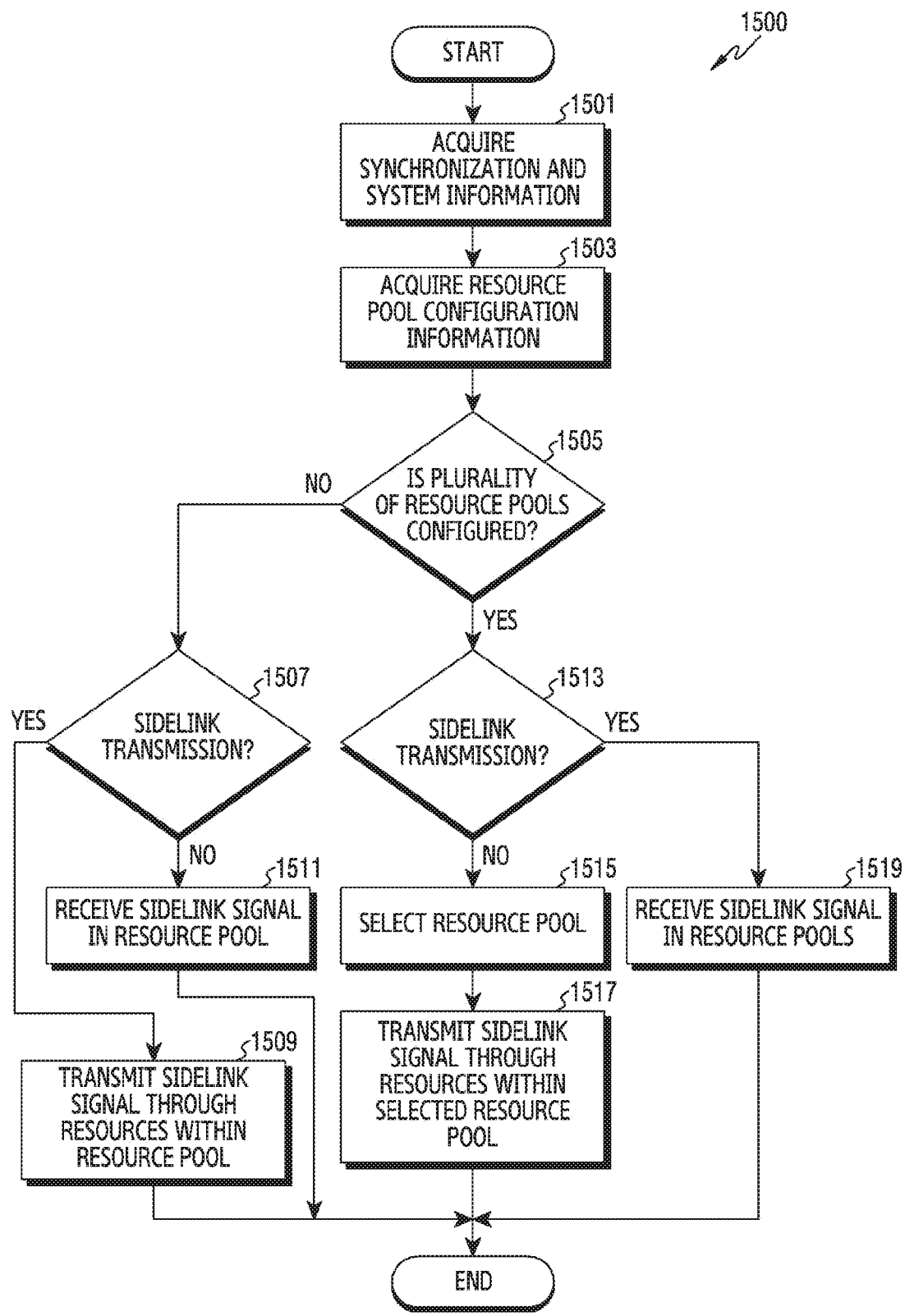
FIG. 15 is a flowchart illustrating a process in which a UE performs sidelink communication in a wireless communication system according to an embodiment of the disclosure.

FIG. 15 is a flowchart 1500 of a UE for performing sidelink communication in a wireless communication system according to an embodiment of the disclosure.

FIG. 15 illustrates a method of operating the UE 120 or the UE 130.

Referring to FIG. 15, in operation 1501, the UE acquires synchronization and system information. For example, when the sidelink UE is located within the coverage of the BS, the UE may perform synchronization with the BS through a downlink synchronization signal and a sidelink-dedicated SIB and acquire sidelink system information. In another example, even though the UE is located within the coverage of the BS, the UE may perform synchronization using a Global Navigation Satellite System (GNSS) or a Global Positioning System (GPS) rather than the BS. Whether the UE within the coverage of the BS performs synchronization with the BS or with the GNSS/GPS may be indicated through system information or RRC or may be pre-configured in the UE by the BS. The sidelink UE performing synchronization may acquire sidelink system information from the BS through a sidelink-dedicated SIB. In another example, the UE may perform synchronization using a synchronization signal transmitted by another sidelink UE. In this case, the synchronization and the acquisition of system information in this operation may be understood as acquisition through a synchronization signal and a sidelink broadcast channel (Physical Sidelink Broadcast Channel (PSBCH)) transmitted by another sidelink UE.

In operation 1503, the UE acquires resource pool configuration information. The acquired sidelink system information may include at least one piece of sidelink BWP information, and the sidelink BWP information may include configuration information of at least one sidelink resource pool. The configuration information of the sidelink resource pool may include at least one of the parameters shown in Table 2, and time-axis resources of the sidelink resource pool may be allocated to sidelink UEs according to the procedure described with reference to FIG. 12 or 15.

In operation 1505, the UE identifies whether a plurality of resource pools is configured. The UE acquiring system information from the BS may acquire BWP configuration information included in the system information and resource pool information included in the BWP configuration information. At this time, the sidelink UE may determine whether a plurality of resource pools are configured.

When a plurality of resource pools is not configured, that is, when a single resource pool is configured, the UE determines whether to perform sidelink transmission or sidelink reception in operation 1507. When a single resource pool is configured and the UE should perform sidelink transmission, the UE transmits a sidelink signal through resources within the resource pool in operation 1509. In other words, the UE may select sidelink transmission resources for transmitting sidelink control information and data in the configured single resource pool and transmit sidelink control information and data through the selected resources. At this time, sidelink transmission resources may be selected by various methods such as sensing and random selection. The sidelink UE selecting the transmission resources may transmit sidelink control information and data information through selected resources. When a single resource pool is configured and the UE should perform sidelink reception, the UE may receive sidelink control information and data information in the configured single resource pool in operation 1511.

When a plurality of resource pools is configured, the UE determines whether to perform sidelink transmission or sidelink reception in operation 1513. When a plurality of resource pools are configured and the UE should perform sidelink transmission, the UE selects one of the plurality of resource pools in operation 1515. Subsequently, in operation 1517, the UE transmits a sidelink signal through resources within the selected resource pool. In other words, the UE may select sidelink transmission resources for transmitting sidelink control information and data in the configured single resource pool and transmit sidelink control information and data through the selected resources. At this time, sidelink transmission resources may be selected through various methods such as sensing and random selection. The sidelink UE selecting the transmission resources may transmit sidelink control information and data information through selected resources. When a plurality of resource pools is configured and the UE should perform sidelink reception, the UE may receive sidelink control information and data information in the plurality of configured resource pools in operation 1519.

Meanwhile, the sidelink transmission UE and reception UE may be located outside the coverage of the BS or some of the sidelink transmission and reception UEs may be located within the coverage of the BS (in-coverage) and the remaining UEs may be located outside the coverage of the BS (out-of-coverage). In this case, the sidelink transmission and reception UEs may perform sidelink transmission and reception within a preconfigured sidelink BWP, and a plurality of sidelink resource pools may be configured within the sidelink BWP.

As described with reference to FIG. 14 or 15, when a plurality of resource pools is configured, the UE may transmit a sidelink signal after selecting one resource pool. Hereinafter, the disclosure describes various embodiments of matters considered in resource pool selection.

Method 1) Resource Pool Selection Based on Communication Type

Requirements may vary depending on the type of sidelink communication such as unicast, groupcast, and broadcast. For example, unicast communication may operate sidelink HARQ and sidelink Channel State Information (CSI) feedback and thus may be suitable for performing highly reliable sidelink communication. However, in the case of unicast communication, a delay time (or latency) of sidelink communication may increase due to the operation of feedback. On the other hand, broadcast communication cannot support sidelink HARQ and sidelink CSI feedback, and thus may achieve relatively lower reliability than unicast communication. However, in the case of broadcast communication, there is no feedback operation, and it is possible to reduce a delay time of sidelink communication compared to unicast communication operating feedback. Accordingly, the sidelink resource pool may be configured independently according to the type of sidelink communication, such as unicast, groupcast, and broadcast. That is, a resource pool used by UEs performing sidelink unicast communication, a resource pool used by UEs performing sidelink groupcast communication, and a resource pool used by UEs performing sidelink broadcast communication may be configured separately. In this case, the UE may select a corresponding resource pool according to the type of sidelink communication to be performed. When a plurality of resource pools supports the same type, the UE may randomly select one resource pool, or may select one resource pool through another method described in the disclosure.

Method 2) Resource Pool Selection Based on Whether Feedback Channel is Needed

When a resource pool is configured according to a communication type, inefficiency of the use of resources may occur depending on the number of UEs performing sidelink unicast, groupcast, and broadcast communication, so it may not be preferable to configure resource pools for each communication type. Accordingly, a method of sharing a resource pool regardless of a sidelink communication type may be used. That is, according to an embodiment, UEs performing unicast communication, groupcast communication, and broadcast communication may share and use a resource pool. When UEs performing unicast communication, groupcast communication, and broadcast communication share a resource pool, some UEs may need a PSFCH for HARQ feedback, and the remaining UEs may not need a PSFCH for HARQ feedback. For example, UEs performing unicast communication, groupcast communication, and broadcast communication may or may not be configured to operate HARQ feedback. A UE performing sidelink broadcast communication cannot operate HARQ feedback. Accordingly, some UEs may need a PSFCH or some UEs may not need a PSFCH according to a sidelink communication type and whether HARQ feedback is operated.

Therefore, when a first resource pool includes a PSFCH and a second resource pool does not include a PSFCH, among the plurality of configured resource pools, the UE may select a resource pool according to whether the PSFCH is needed, that is, whether an HARQ feedback operation is needed. According to an embodiment, whether the PSFCH is needed may depend on a sidelink communication type, such as unicast, groupcast, or broadcast. When the sidelink transmission UE should perform broadcast communication, unicast communication in which no HARQ feedback is configured, or groupcast communication in which no HARQ feedback is configured, the UE may select a resource pool in which no PSFCH resource is configured. On the other hand, when the UE should perform unicast and groupcast communication in which HARQ feedback is configured, the UE may select a resource pool in which PSFCH resources are configured. When all of the plurality of resource pools include the PSFCH or do not include the PSFCH, the UE may randomly select one resource pool or may select one resource pool through another method described in the disclosure.

The resource efficiency may differ and the UE operation may be advantageous or disadvantageous according to the method of configuring the sidelink resource pool and the method of configuring PSFCH resources within the sidelink resource pool. A structure of slots including the PSFCH in the resource pool will be described with reference to FIGS. 16 and 17.

Method 3) Resource Pool Selection Based on Resource Location

A plurality of configured resource pools may occupy different resources (for example, RBs or RBGs) on a frequency axis or different resources (for example, slots) on a time axis. When a plurality of resource pools occupy different resources on a time axis, the UE may select a resource pool including resources located first on the time axis after the time point at which sidelink data is generated. Accordingly, the UE may minimize the transmission delay of sidelink data. When resources located first in the resource pools are the same on the time axis, the UE may randomly select one resource pool or may select one resource pool through another method described in the disclosure.

Method 4) Resource Pool Selection Based on Downlink Reference Signal Received Power (RSRP)

When the BS operates time/frequency resources for cellular communication and time/frequency resources for sidelink communication in the same carrier, in other words, when cellular communication and sidelink communication share resources, the sidelink transmission may interfere with an uplink signal received by the BS. For example, when sidelink transmission and uplink transmission are performed in different frequency blocks of the same slot, the sidelink transmission may cause in-band emission to an uplink signal received by the BS even though orthogonal resources in the frequency axis are used. This is because, when the sidelink transmission UE located near the BS performs sidelink transmission with high transmission power, sidelink signals beyond the dynamic range of a reception side of the BS act as interference and distort a signal received through the uplink. This problem may be solved by reducing the sidelink transmission power of the sidelink transmission UE adjacent to the BS. However, when sidelink transmission power is reduced, a sidelink signal may not reach the sidelink reception UE. In order to solve the problem, the UE may select a resource pool based on downlink RSRP. That is, sidelink UEs having downlink RSRP values similar to those of the BS have a high probability of being located at similar distances from the BS. When such UEs use the same resource pool, interference of sidelink transmission on the reception side of the BS may be reduced, and possibility that the sidelink signal reaches the reception UE may be relatively increased.

The UE (sidelink transmission UE) which should perform sidelink transmission may measure downlink RSRP through a Downlink Reference Signal (DL RS) transmitted by the BS through the downlink. At this time, the downlink reference signal may be a Secondary Synchronized Signal (SSS) and/or a DMRS or downlink Channel State Information Reference Signal (CSI-RS) of a Physical Broadcast Channel (PBCH), and the reference signal used for measuring downlink RSRP may be indicated by the BS.

In order to select a resource pool based on the downlink RSRP, information indicating an upper threshold and a lower threshold of the downlink RSRP may be transmitted through system information. For example, when two resource pools (for example, resource pool A and resource pool B) are configured, information indicating thresholds may include a first upper threshold and a first lower threshold of the downlink RSRP which can be applied to resource pool A and a second upper threshold and a second lower threshold of the downlink RSRP which can be applied to resource pool B. When information indicating thresholds is included in system information, the sidelink transmission UE may measure a downlink RSRP value through a downlink reference signal and select a resource pool that satisfies an indicated condition from among the plurality of resource pools.

Method 5) Resource Pool Selection Based on Sidelink RSRP

One sidelink reception UE may receive sidelink control information and data information from the transmission UE. At this time, another neighboring transmission UE may transmit sidelink control information and data information to another reception UE. A transmission signal from another transmission UE may act as interference in a reception signal of the reception UE in the same way that the sidelink signal causes interference in the BS in Method 4) above. This interference issue may be generated even when time/frequency resources for cellular communication and time/frequency resources for sidelink communication are not operated in the same carrier. Accordingly, resource pool selection based on the sidelink RSRP may be needed.

The sidelink transmission UE may measure sidelink RSRP through a reference signal (Sidelink Reference Signal (SL RS) transmitted by another sidelink UE through the sidelink. At this time, the sidelink reference signal may be a Sidelink Secondary Synchronization Signal (S-SSS) and/or a DMRS or a sidelink CSI-RS of a Physical Sidelink Broadcast Channel (PSBCH), and a reference signal used for measuring sidelink RSRP may be configured through PC-5 RRC or one of the reference signals may always be used to measure sidelink RSRP. The sidelink transmission UE may perform a PC-5 RRC connection setup with the sidelink reception UE before performing unicast communication. Further, the sidelink transmission UE which desires to perform groupcast communication may establish a unicast connection with reception UEs within a group. The sidelink transmission UE may measure a sidelink RSRP value during a process of establishing the connection and may select a resource pool through the RSRP values.

In order to select a resource pool based on sidelink RSRP, information indicating an upper threshold and a lower threshold of the sidelink RSRP that can be applied to each resource pool may be transmitted by the BS through system information. For example, when two resource pools (for example, resource pool A and resource pool B) are configured, information indicating thresholds may be a first upper threshold and a first lower threshold of the sidelink RSRP which can be applied to resource pool A and a second upper threshold and a second lower threshold of the sidelink RSRP that can be applied to resource pool B. In another example, information indicating the upper threshold and the lower threshold of the sidelink RSRP may be configured through PC-5 RRC, or may be pre-configured in the UE.

Methods 4) and 5) Described Above May be Complementary to Each Other.

According to an embodiment, Method 4) or 5) may be selectively used according to a link of thresholds indicated by information included in system information. For example, when information on thresholds of downlink RSRP is included in system information, the sidelink transmission UE may measure a downlink RSRP value through a downlink reference signal and select a resource pool that satisfies a condition. In another example, when information on thresholds of sidelink RSRP is included in system information, the sidelink transmission UE may measure a sidelink RSRP value through a sidelink reference signal and select a resource pool that satisfies a condition.

According to another embodiment, for the operation of selecting a resource pool of the sidelink transmission UE, the BS may transmit information indicating an upper threshold of min(downlink RSRP, sidelink RSRP) and a lower threshold of min(downlink RSRP, sidelink RSRP) which can be applied to each resource pool through system information. For example, when two resource pools (for example, resource pool A and resource pool B) are configured, information indicating thresholds may include a first upper threshold of min(downlink RSRP, sidelink RSRP) and a first lower threshold of min{downlink RSRP, sidelink RSRP} that can be applied to resource pool A and a second upper threshold of min{downlink RSRP, sidelink RSRP} and a second lower threshold of min{downlink RSRP, sidelink RSRP} which can be applied to resource pool B. In this case, after measuring both the downlink RSRP and the sidelink RSRP, the sidelink transmission UE may identify the smaller value among the downlink RSRP and the sidelink RSRP and select a resource pool that satisfies a condition.

In Methods 4) and 5), the RSRP is used to select a resource pool. The RSRP is an example of an index indicating channel quality, and may be replaced with another index. For example, one of a Signal-to-Noise Ratio (SNR), a Signal-to-Interference-and-Noise Ratio (SINR), a Reference Signal Received Quality (RSRQ), and an RSSI may be used.

Method 6) Resource Pool Selection Based on Congestion Level

The sidelink transmission UE may measure a congestion level and select a resource pool having a congestion level, that is, a resource pool in which congestion is low. The congestion level may be measured through a ratio (=B/A) of the number (=B) of resources occupied by another UE to the number (=A) of total resources included in the sidelink resource pool. Sidelink resources may be the unit that can be used for transmission by one sidelink UE, and may be defined as K symbols and N resource blocks ($1 \leq K \leq 14$, $1 \leq N \leq Nmax$). Nmax may be the maximum number of frequency blocks that can be used by one sidelink UE for sidelink transmission, and may be a parameter determined according to the BWP size, the size of a frequency of the resource pool, and a capability of the sidelink UE. B may be calculated by the sidelink transmission UE through a comparison between a total Received Signal Strength Indicator (RSSI) of OFDM symbols included in the sidelink resource pool and a threshold of an RSSI configured (or pre-configured) by the BS or through PC-5 RRC. More specifically, when it is assumed that the number of OFDM symbols included in the resource pool is X, an RSSI value for each symbol (for example, a total of X RSSI values) may be calculated, and the average value of RSSIs may be calculated over X symbols. The sidelink transmission UE may compare the measured RSSI value with a threshold value of the RSSI configured by the BS or through PC-5 RRC or pre-configured and, when the measured RSSI value is larger than the configured RSSI threshold, determine that the corresponding resources are occupied by another UE. Accordingly, the corresponding resources may be included in B. The calculation of the RSSI may be performed for all symbols included in the resource pool in the example, but may be performed for some symbols included in the resource pool.

The congestion level may be measured during a specific time interval. For example, A and B may be measured for sidelink resources existing within a time interval between slots [n−a, n−1] in the configured resource pool. Accordingly, the congestion level measured in slot n may be a congestion level measured for sidelink resources existing within a time interval between slots [n−a, n−1]. At this time, a may be a fixed value (or a pre-configured value) or may be configured through BS system information or PC-5 RRC.

Two or more resource pools having the same congestion level may exist. That is, two or more resource pools having the lowest congestion level may exist, and congestion levels in respective resource pools may be the same. In this case, the UE may randomly select one resource pool, or may select one resource pool through another method described in the disclosure.

Method 7) Resource Pool Selection Based on Index of Resource Pool

Resource pools may have unique indexes. Accordingly, the sidelink transmission UE may select a resource pool based on indexes of resource pools. For example, the UE may select the resource pool having the lowest index or the resource pool having the highest index.

Method 8) Resource Pool Selection Based on Quality of Service (QoS)

Sidelink UEs may receive a configuration of a QoS parameter according to a type of sidelink data from a higher layer of the UE. For example, specific sidelink data may set a high value on requirements of a delay time (or latency), specific sidelink data may set a high value on requirements of reliability, and specific sidelink data may set a high value on requirements of both delay time and reliability. The UE may select a resource pool according to requirements for satisfying the QoS.

For example, in the case of sidelink data setting a high value on requirements of reliability, the UE may select a resource pool having a relatively low congestion level. In the case of sidelink data setting a high value on requirements of the delay time, the UE may select sidelink resources of which the frequency is low on a time axis even though the congestion level is relatively high. For example, when two resource pools (for example, resource pool A and resource pool B) are configured, the number of slots included in one radio frame of resource pool A may be relatively smaller than resource pool B. In this case, the sidelink UE may select resource pool B.

In another example, when QoS requirements of sidelink data, control information, or feedback information transmitted by the sidelink transmission UE put a higher priority on a delay time (latency) than reliability or when QoS requirements need a shorter delay time than general sidelink data information (for example, when general sidelink data should guarantee a delay time of 10 ms but QoS requirements of sidelink data need a delay time of 5 ms), the sidelink transmission UE may select a resource pool in which no PSFCH resource is configured. On the other hand, when QoS requirements of sidelink data, control information, or feedback information transmitted by the sidelink transmission UE put a higher priority on reliability than on a delay time or when QoS requirements need higher reliability than general sidelink data information (for example, when general sidelink data should guarantee reliability of $10^{-2}$ but QoS requirements of sidelink data need reliability of $10^{-3}$), the sidelink transmission UE may select a resource pool in which PSFCH resources are configured. Reference values of delay time or reliability may be configured by PC-5 RRC.

When the number of resource pools that satisfies QoS requirements is plural, the UE may randomly select one resource pool, or may select one resource pool through another method described in the disclosure. In a specific example, a plurality of resources pools (for example, M resource pools) that satisfy QoS requirements may exist, M1 resource pools may have PSFCH resources among the M resource pools, and M2 resource pools may have no PSFCH resources (M=M1+M2). In this case, the UE may select a resource pool by applying one of the methods described in the disclosure, or may randomly select a resource pool.

A method defined by a combination of two or more of Methods 1) to 8) may be used. For example, two or more methods may be sequentially combined. In this case, when one resource pool is not selected by one method, one resource pool may be selected by another method. In another example, two or more methods may be combined with predefined weights, and one resource pool may be selected by a sum of weights based on the determination result of the plurality of methods.

Figure 16:
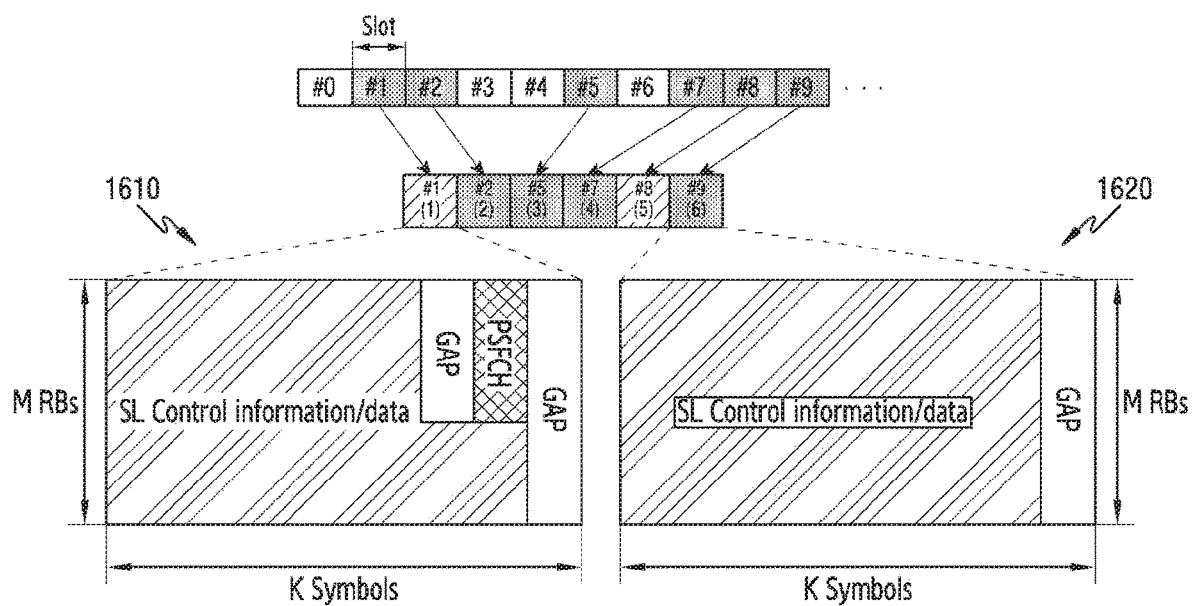
FIG. 16 illustrates an example of the structure of a sidelink resource pool in a wireless communication system according to an embodiment of the disclosure.

FIG. 16 illustrates an example of the structure of a sidelink resource pool in a wireless communication system according to an embodiment of the disclosure.

Referring to FIG. 16, slots of indexes 1, 2, 5, 7, 8, and 9 are a set of sidelink slots configured as a sidelink resource pool. Slots of indexes 0, 3, 4, and 6 are slots for uplink communication or downlink communication. At this time, slots of indexes 1 and 8 are slots 1610 including PSFCH resources, and slots of indexes 2, 5, 7, and 9 are slots 1620, which do not include PSFCH resources. In the example of FIG. 16, slots of indexes 1, 2, 5, 7, 8, and 9 may be included in the same sidelink resource pool or in different sidelink resource pools. When sidelink slots are included in the same resource pool, FIG. 16 illustrates the case in which time-axis resources of the PSFCH starts at slot index 1 and exist according to a period of four slots. When sidelink slots are included in different sidelink resource pools, a set of slots that do not include PSFCH resources (for example, slots of indexes 2, 5, 7, and 9) may configure one sidelink resource pool and a set of slots including PSFCH resources (for example, slots of indexes 1 and 8) may configure another sidelink resource pool.

In FIG. 16, one slot includes K symbols and M resource blocks. K, M, and the number of RBs included in an RBG may be included in resource pool configuration information. Accordingly, in the slot 1610 and the slot 1620, K and M may be the same or different according to the configuration of the resource pool. For example, when the slot 1610 and the slot 1620 belong to the same resource pool, K and M may be the same. However, when the slot 1610 and the slot 1620 belong to different resource pools, K and M may be different.

In the slot 1610 and the slot 1620, at least one symbol, which is located last, may be used as a GAP, which is a guard symbol for switching to reception after sidelink transmission or to transmission after sidelink reception. For example, when one symbol is used as the GAP, K−1 symbols may be used for transmitting and receiving a PSCCH, a PSSCH, and a PSFCH. Meanwhile, the slot 1610 may include an additional guard symbol, unlike the slot 1620. At this time, the additional guard symbol may be used for switching of PSFCH transmission after PSCCH and PSSCH reception or PSFCH reception after PSCCH and PSSCH transmission.

The slot 1620 of FIG. 16 does not include the PSFCH, and thus the sidelink UE which desires to transmit or receive the PSFCH cannot use the slots of indexes 2, 5, 7, and 9 of FIG. 16. Accordingly, UEs which desire to increase reception reliability of a sidelink signal through HARQ feedback may not use the structure of the slot 1620. Meanwhile, in the case of the slot 1610, PSFCH resources exist in at least some of the M resource blocks included in the slot, and PSFCH resources do not exist in the remaining resource blocks. Accordingly, the sidelink UE that desires to transmit or receive the PSFCH (for example, a UE which desires to perform unicast communication in which the HARQ feedback operation is configured or groupcast communication in which the HARQ feedback operation is configured) may transmit or receive the PSFCH in the corresponding PSFCH resources. Further, a UE that does not need the PSFCH (for example, a UE which desires to perform unicast communication in which no HARQ feedback operation is configured or groupcast or broadcast communication in which no HARQ feedback operation is configured) may transmit the PSCCH/PSSCH in symbols except for an RBG which does not include PSFCH resources and a GAP (for example, K−1 symbols, when it is assumed that one symbol is the GAP). Alternatively, UEs that do not need the PSFCH may transmit the PSCCH/PSSCH in symbols except for an RBG including PSFCH resources and GAP+PSFCH+GAP (for example, K−3 symbols when one symbol GAP, one symbol PSFCH, and another symbol GAP are assumed). In the example of FIG. 16, the UE transmitting and receiving only the PSCCH/PSSCH without transmitting and receiving the PSFCH may transmit or receive the PSCCH/PSSCH through an RBG and (K−3) symbols in which the PSFCH exists, or may transmit or receive the PSCCH/PSSCH through the remaining RBGs and (K−1) symbols in which PSFCH resources do not exist. Accordingly, since the UE which does not need PSFCH resources and the UE which needs PSFCH resources coexist within the same resource pool, inefficiency of use of resources may be reduced compared to the case in which different resource pools are used for each type of sidelink communication.

Adoption of the slot 1610 of FIG. 16 may influence Automatic Gain Control (AGC) configuration as follows. "AGC configuration" refers to an operation of determining and applying a gain value for the AGC operation.

The UE first receiving the PSCCH/PSSCH in slot #1 or slot #9 may use a first symbol of the corresponding slot for the AGC configuration for receiving the PSCCH/PSSCH. After performing the AGC configuration, the UE may receive the remaining symbols within the slot on the basis thereof. Meanwhile, the UE first receiving the PSFCH in slot #1 or slot #8 may use a first PSFCH symbol of the corresponding slot for the AGC configuration for receiving the PSFCH. After performing the AGC configuration, the UE may receive the remaining PSFCH symbols on the basis thereof.

The AGC configuration may be performed based on energy received in all bandwidths of the resource pool to be received, and when a gain value for the AGC operation is configured once through a first symbol, may be equally applied to the remaining symbols of the corresponding slot. Accordingly, the UE receiving both the PSCCH/PSSCH and the PSFCH may use the first symbol of the slot 1610 and the first symbol of the PSFCH for the AGC configuration. However, in the case of the slot 1610, the PSFCH is received in some RBGs of the resource pool and the PSCCH/PSSCH is received in the remaining RBGs, and thus the AGC configuration through the first symbol of the PSFCH may have an error. The error may distort a PSFCH reception signal, which may deteriorate the performance of the sidelink.

Figure 17:
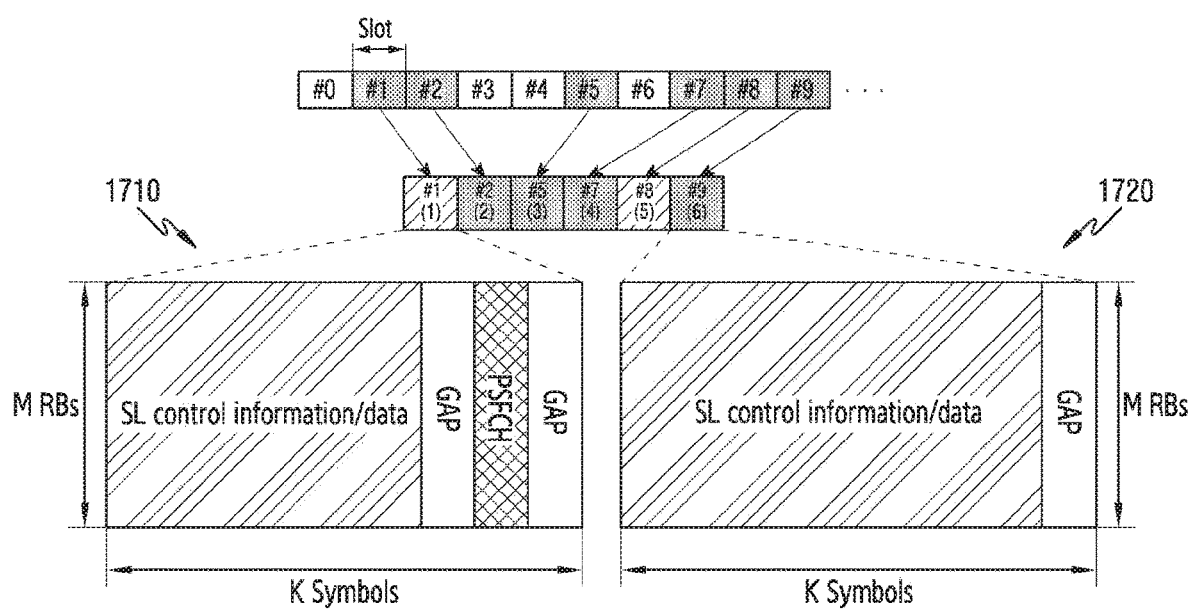
FIG. 17 illustrates another example of the structure of the sidelink resource pool in a wireless communication system according to an embodiment of the disclosure.

FIG. 17 illustrates another example of the structure of the sidelink resource pool in a wireless communication system according to an embodiment of the disclosure.

Referring to FIG. 17, slots of indexes 1, 2, 5, 7, 8, and 9 are a set of sidelink slots configured as a sidelink resource pool. Slots of indexes 0, 3, 4, and 6 are slots for uplink communication or downlink communication. At this time, slots of indexes 1 and 8 are slots 1710 including PSFCH resources, and slots of indexes 2, 5, 7, and 9 are slots 1720, which do not include PSFCH resources. Referring to FIG. 17, in the slot 1710 including PSFCH resources, the PSFCH resources occupy all bandwidths (for example, M RBs) of the resource pool.

In the case of FIG. 16, the UE transmitting and receiving only the PSCCH/PSSCH without transmitting and receiving the PSFCH may transmit or receive the PSCCH/PSSCH through RBG×(K−3) symbols in which PSFCH resources exist, or may transmit or receive the PSCCH/PSSCH through the remaining RBG×(K−1) symbols in which PSFCH resources do not exist. Accordingly, the structure of FIG. 16 may reduce inefficiency of use of resources compared to the case in which different resource pools are used for each type of sidelink communication. However, when the structure of FIG. 17 is used, the UE transmitting or receiving the PSCCH/PSSCH without transmitting or receiving the PSFCH may always use only a maximum of (K−3) symbols. Therefore, the use of the structure of FIG. 17 may be inefficient with regard to use of resources compared to the use of the structure of FIG. 16. However, as described above, a reception performance deterioration problem occurs due to the AGC configuration in FIG. 16, but the problem of the AGC configuration does not occur when the structure of FIG. 17 is used. Accordingly, the slot 1710 of FIG. 17 may have a trade-off relationship between the efficiency of the use of resources and the AGC configuration according to whether the HARQ operation is configured and a method of allocating unicast, groupcast, and broadcast communication schemes to the sidelink resource pool.

As a method of best satisfying the trade-off relationship, the following resource pool configuration method may be considered. In FIG. 17, a slot in which PSFCH resources exist corresponds to the case of slot period 4 (that is, N=4). In another example of the slot period, N=1 (PSFCH resources exist in every slot) and N=2 (PSFCH resources exist in every two slots). Accordingly, in the case of the slot structure of FIG. 17 and N=4, the UE which does not need to transmit and receive the PSFCH (for example, a UE which desires to perform unicast communication in which no HARQ feedback operation is configured or groupcast or broadcast communication in which no HARQ feedback operation is configured) may use slots 1720 of indexes 2, 5, 7, and 9, in which there is no PSFCH resource to transmit or receive the PSCCH/PSSCH, thereby maximizing efficiency of use of resources. Further, the UE which needs to transmit and receive the PSFCH (for example, a UE which desires to perform unicast communication in which the HARQ feedback operation is configured or groupcast communication in which the HARQ feedback operation is configured) may use slots 1710 of indexes 1 and 8, in which PSFCH resources exist to transmit and receive the PSCCH/PSSCH and transmit and receive the PSFCH, thereby solving the problem of the AGC configuration of the PSFCH. Such a method may expand to the case of the structure of the slot 1710 of FIG. 17 and N=2.

Meanwhile, the example may be applied to the case of N=1, but there is an advantage in that the transmission/reception UE which does not need to transmit and receive the PSFCH (for example, a UE which desires to perform unicast communication in which no HARQ feedback operation is configured or groupcast or broadcast communication in which no HARQ feedback operation is configured) inefficiently uses resources. Accordingly, in order to resolve inefficiency of use of resources, a resource pool including the PSFCH and a resource pool which does not include the PSFCH may be configured independently. For example, in FIG. 17, slots of indexes 1 and 8 may correspond to resource pool A, and slots of indexes 2, 5, 7, and 9 may correspond to resource pool B. The UE which needs to transmit and receive the PSFCH (for example, a UE which desires to perform unicast communication in which the HARQ feedback operation is configured or groupcast communication in which the HARQ feedback operation is configured) may use resource pool A, and the UE which does not need to transmit and receive the PSFCH (for example, a UE which desires to perform unicast communication in which no HARQ feedback operation is configured or groupcast or broadcast communication in which no HARQ feedback operation is configured) may use resource pool B.

Figure 18:
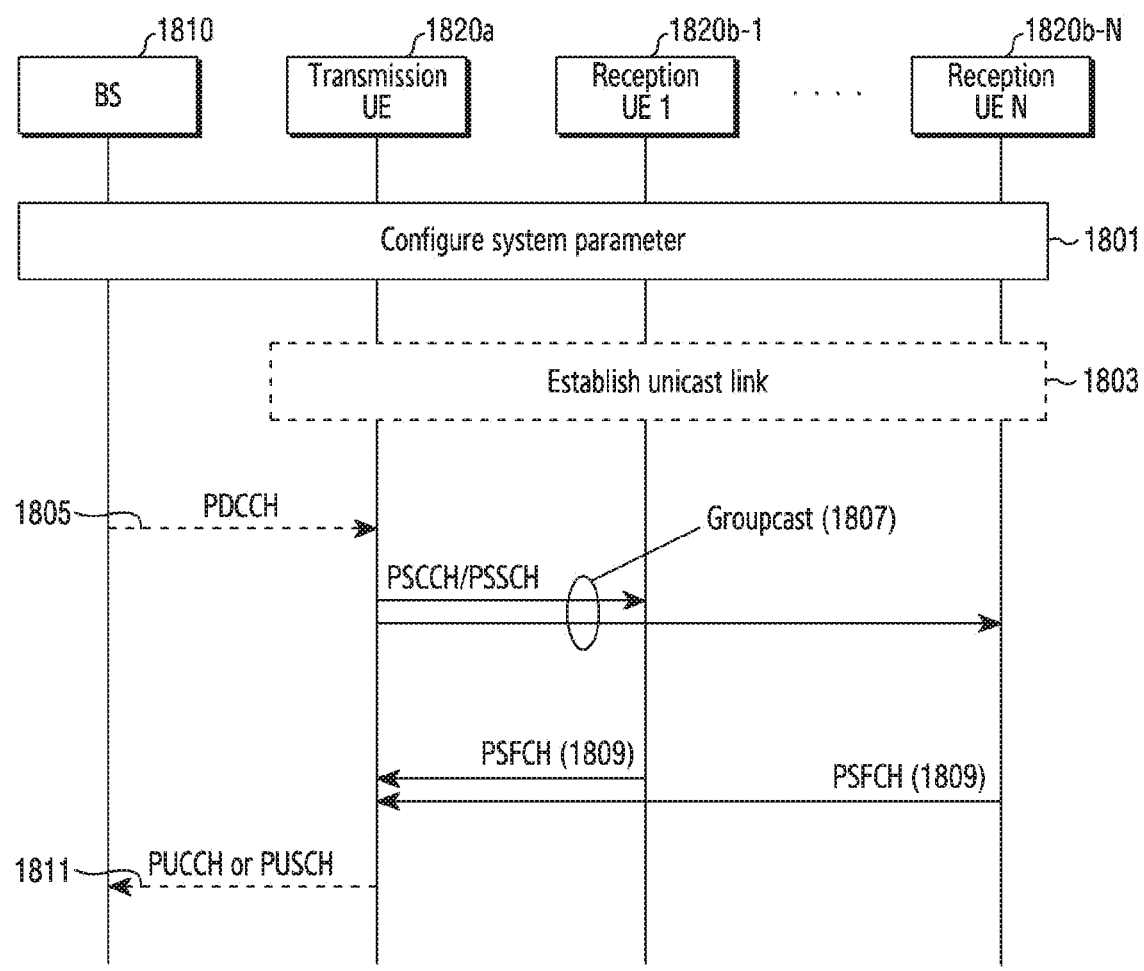
FIG. 18 illustrates an example of a sidelink Hybrid Automatic Repeat Request (HARQ) operation method in a wireless communication system according to an embodiment of the disclosure.

FIG. 18 illustrates an example of a sidelink Hybrid Automatic Repeat Request (HARQ) operation method in a wireless communication system according to an embodiment of the disclosure.

FIG. 18 may include embodiments of FIGS. 12 to 13, and FIGS. 12 to 13 illustrate unicast communication in which one transmission UE and one reception UE exist. Unlike FIGS. 12 to 13, FIG. 18 illustrates an example of groupcast communication in which the number of reception UEs is two or more. FIG. 18 illustrates signal exchange between a BS 1810, a transmission UE 1820*a*, a reception UE 1820*b*-1, . . . , a reception UE 1820*b*-N according to a sidelink communication procedure of groupcast. A reception UE 1820*b*-*i* may be used as an example to describe the operation of the reception UE or describe the reception UE.

Referring to FIG. 18, in operation 1801, the BS 1810 configures a system parameter. FIG. 18 illustrates a scenario in which the transmission UE 1820*a* and the reception UEs 1820*b*-1 to 1820*b*-N exist within the coverage of the BS 1810, and thus the transmission UE 1820*a* and the reception UEs 1820*b*-1 to 1820*b*-N may receive system information for sidelink communication from the BS 1810. A parameter for sidelink communication may be configured in the UEs receiving the system information, and the system information may include resource pool configuration information. The resource pool configuration information may include at least one piece of the information shown in Table 2. When the transmission UE 1820*a* and the reception UE 1820*b*-*i* exist outside the coverage of the BS 1810 (out-of-coverage scenario of FIG. 6A), the transmission UE 1820*a* and the reception UEs 1820*b*-*i* may receive a configuration of the parameter for sidelink communication in advance or may receive the configuration through a Sidelink Master Information Block (SL-MIB) transmitted through a sidelink synchronization channel. The parameter may include resource pool configuration information, and the resource pool configuration information may include at least one piece of the information shown in Table 2.

In operation 1803, the transmission UE 1820*a* and the reception UE 1820*b*-*i* establish a link. Before groupcast communication, all of the transmission UE 1820*a* and the reception UEs within the same group may perform a PC-5 RRC connection setup through the unicast link establishment procedure described with reference to FIG. 8. In the scenario, the unicast link establishment procedure may be included in FIG. 18. However, unlike FIG. 18, there may be a scenario of groupcast communication performed without any PC-5 RRC connection setup. In this scenario, the unicast link establishment procedure (operation 1803) may be omitted in FIG. 18. Further, although FIG. 18 illustrates that the unicast link establishment procedure is performed after system parameter configuration information of the BS 1810 is received, the system parameter configuration information may be received after the unicast link establishment procedure is performed. When the BS 1810 does not exist, the parameter for sidelink communication may be configured through the SL-MIB after the unicast link establishment procedure is performed.

When the resource allocation method in mode 1 illustrated in FIG. 12 is used in FIG. 18, the BS 1810 may transmit sidelink scheduling information to the groupcast transmission UE 1820*a* through a downlink control channel (Physical Downlink Control Channel (PDCCH)) in operation 1805. In operation 1807, the transmission UE 1820*a* receiving the sidelink scheduling information may transmit sidelink control information and data information to the reception UEs 1820*b*-1 to 1820*b*-N through a PSCCH and a PSSCH based on scheduling information of the BS 1810. At this time, Sidelink Control Information (SCI) may be transmitted separately through two operations. SCI transmitted through the PSCCH may be called first SCI, and SCI transmitted through the PSSCH may be called second SCI. The first SCI and the second SCI may be transmitted through the same sidelink slot or different sidelink slots. Different pieces of sidelink control information may be included in the first SCI and the second SCI. For example, both a destination identifier (for example, destination L2 ID) and a source identifier (for example, transmitter L2 ID) may be inserted into the first SCI and transmitted. Alternatively, the destination identifier (for example, destination L2 ID) may be transmitted through the first SCI, and the source identifier (for example, transmitter L2 ID) may be inserted into the second SCI and transmitted. Further, 1-bit information indicating whether to activate or deactivate the HARQ operation may be included in the first SCI or the second SCI. More specifically, when information indicating deactivation of the HARQ operation is included in the first SCI or the second SCI even though PSFCH resource configuration information of the HARQ operation (for example, a period of the PSFCH) is included in the resource pool configuration information, the transmission UE 1820*a* may deactivate the HARQ operation. The reason thereof is described below.

In the case of broadcast communication, sidelink control information and data information are transmitted to a plurality of unspecified UEs, and thus it may be difficult to operate HARQ in broadcast communication. In the case of unicast and groupcast communication, the HARQ operation may be or may not be configured according to a QoS of sidelink data. For example, specific sidelink data has high requirements of reception reliability and thus HARQ operation may be configured. However, specific sidelink data has low requirements of reception reliability, and thus HARQ operation may not be configured. In another example, specific sidelink data has high requirements of a delay time of sidelink communication (that is, short delay time), and thus HARQ operation may not be configured. However, specific sidelink data has low requirements of a delay time (that is, long delay time is no problem), and thus may configure HARQ operation. As described above, the HARQ operation may be configured or released according to the QoS of sidelink data transmitted by the transmission UE 1820*a*. Since whether to configure the HARQ operation may vary depending on the QoS, the configuration may be performed by a V2X layer receiving the QoS from an application layer or an application that manages the QoS.

However, in this case, the HARQ operation of the reception UE 1820-*i* may be impossible. More specifically, the HARQ operation should be performed by a PHY/MAC layer. However, if the HARQ operation is managed by a V2X layer or an application layer, the PHY/MAC layer of the reception UE 1820*b*-*i* cannot perform the HARQ operation. That is, the PHY/MAC layer of the reception UE 1820*b*-*i* should recognize whether to operate the HARQ before transmitting the corresponding packet to the V2X layer or the application layer of the reception UE, and the reception UE 1820*b*-*i* may perform HARQ combining in the PHY layer on the basis thereof. Accordingly, for the HARQ operation of the PHY/MAC layer, the transmission UE 1820*a* may include a 1-bit indicator indicating whether to operate the HARQ in the first SCI or the second SCI.

Meanwhile, as illustrated in FIG. 13, the resource allocation method in mode 2 may be used in FIG. 18. In this case, the transmission and reception procedure of the PDCCH (operation 1805) in FIG. 18 may be omitted.

In operation 1809, the reception UEs 1820*b*-1 to 1820*b*-N receiving the PSCCH and the PSSCH from the transmission UE 1820*a* may determine whether the destination L2 ID included in the SCI of the PSCCH (that is, the first SCI) indicates the reception UE, and when the destination L2 ID indicates the reception UE, decode the PSSCH through time and/or frequency resource allocation information of the PSSCH included in other SCI (that is, the second SCI) transmitted through the PSSCH (time and/or frequency resource allocation information of the PSSCH is included in the second SCI). In another example, when the destination ID included in the first SCI indicates the reception UE, the reception UE 1820*b*-*i* may decode the PSSCH through time and/or frequency resource allocation information of the PSSCH included in the first SCI (time and/or frequency resource allocation information of the PSSCH is included in the first SCI).

The reception UE 1820*b*-*i* may finally determine whether sidelink data is transmitted to the reception UE itself through the destination L2 ID included in a MAC-Control element (MAC-CE) transmitted through the PSSCH after the PSSCH is decoded. That is, the destination L2 ID may consist of N bits, and N1 bits may be transmitted through the first SCI and N2 bits may be transmitted through the MAC-CE (N=N1+N2). When the destination L2 ID included in the received first SCI does not indicate the reception UE, the reception UE 1820*b*-*i* may not decode the second SCI and the PSSCH indicated by the corresponding SCI.

When the first SCI of the PSCCH transmitted from the transmission UE 1820*a* indicates the destination L2 ID of the reception UE, the reception UE 1820*b*-*i* may decode the PSSCH. At this time, the reception UE 1820*b*-*i* may transmit each of HARQ-ACK and HARQ-NACK to the transmission UE 1820*a* or only HARQ-NACK to the transmission UE 1820*a* according to the HARQ feedback method and whether the decoding of the PSSCH is successful, indicated by the received first SCI or second SCI. For example, when the transmission UE 1820*a* indicates an HARQ feedback method of transmitting each of HARQ-ACK and HARQ-NACK to the transmission UE 1820*a* in the first SCI or the second SCI, the reception UE 1820*b*-*i* may transmit HARQ-ACK to the transmission UE 1820*a* if the PSSCH decoding is successful, and transmit HARQ-NACK to the transmission UE 1820*a* if the PSSCH decoding fails. On the other hand, when the transmission UE 1820*a* indicates an HARQ feedback method of transmitting only HARQ-NACK in the first SCI or the second SCI, the reception UE 1820*b*-*i* may transmit HARQ-NACK to the transmission UE 1820*a* only when the PSCCH decoding fails. That is, the reception UE 1820*b*-*i* may not transmit HARQ-ACK to the transmission UE 1820*a* when the PSSCH decoding is successful.

When the transmission UE 1820*a* indicates the reception UE 1820*b*-*i* to transmit each of HARQ-ACK and HARQ-NACK, at least one piece of HARQ-NACK information may be included in HARQ feedback information received by the transmission UE 1820*a* from a plurality of reception UEs. In this case, the transmission UE 1820*a* receiving the HARQ feedback information may retransmit the PSSCH. The PSSCH may be retransmitted to the reception UE transmitting HARQ-NACK through unicast communication. Alternatively, the PSSCH may be retransmitted through groupcast communication. That is, all reception UEs of the group communication may receive the retransmitted PSSCH. At this time, the UE transmitting HARQ-ACK in response to transmission of the PSSCH may ignore retransmission of the PSSCH (that is, may not perform decoding).

When all pieces of HARQ feedback information received from all reception UEs 1820*b*-*i* to 1820*b*-N in the group are ACK, the transmission UE 1820*a* receiving the HARQ feedback information may not retransmit the PSSCH. That is, the transmission UE 1820*a* does not perform retransmission for already transmitted data, and when new sidelink data to be transmitted is generated, transmit a new PSSCH. When new sidelink data to be transmitted is not generated, the transmission UE 1820*a* may stop the PSSCH transmission operation.

In operation 1811, the transmission UE 1820*a* may transmit sidelink HARQ feedback information received from the reception UE 1820*b*-*i* to the BS 1810. The transmission UE 1820*a* may transmit sidelink HARQ feedback information received from the reception UE 1820*b*-*i* to the BS 1810 according to the configuration of the BS 1810 (that is, when the BS 1810 makes the configuration, sidelink HARQ feedback information may be transmitted to the BS 1810). The sidelink HARQ feedback information may be transmitted through a PUCCH or a PUSCH.

For the HARQ operation in the groupcast, the transmission UE 1820*a* should know information on reception UEs within the same group. For example, for the sidelink HARQ operation, the transmission UE 1820*a* should identify sidelink HARQ feedback information transmitted from different reception UEs. That is, the transmission UE 1820*a* needs to determine which reception UE transmits HARQ-ACK and which reception UE transmits HARQ-NACK. Further, the transmission UE 1820*a* needs to identify which reception UE uses HARQ feedback time/frequency/code resources and which HARQ feedback time/frequency/code resources are used by the reception UE. In order to support the determination and the identification by the transmission UE 1820*a*, the sidelink HARQ operation method illustrated in FIG. 18 may be applied when the unicast link connection setup between all of the transmission UE 1820*a* and the reception UEs 1820*b*-1 to 1820*b*-N within the group is performed or when the transmission UE receives information on the reception UEs 1820*b*-1 to 1820*b*-N within the group (that is, group information) from a higher layer of the transmission UE. The group information may be at least one of the number of reception UEs 1820*b*-1 to 1820*b*-N included in the group (or the number of transmission UE 1820*a* and reception UEs 1820*b*-1 to 1820*b*-N included in the group), an ID of the transmission UE 1820*a*, and IDs of the reception UEs 1820*b*-1 to 1820*b*-N. However, the sidelink HARQ operation method cannot be applied when the unicast link connection setup between all of the transmission UE 1820*a* and the reception UEs 1820*b*-1 to 1820*b*-N within the group is not performed or when the group information is not provided from the higher layer of the transmission UE 1820*a*.

FIG. 18 illustrates the HARQ operation method in groupcast communication, but the same may also be applied to unicast communication.

Figure 19:
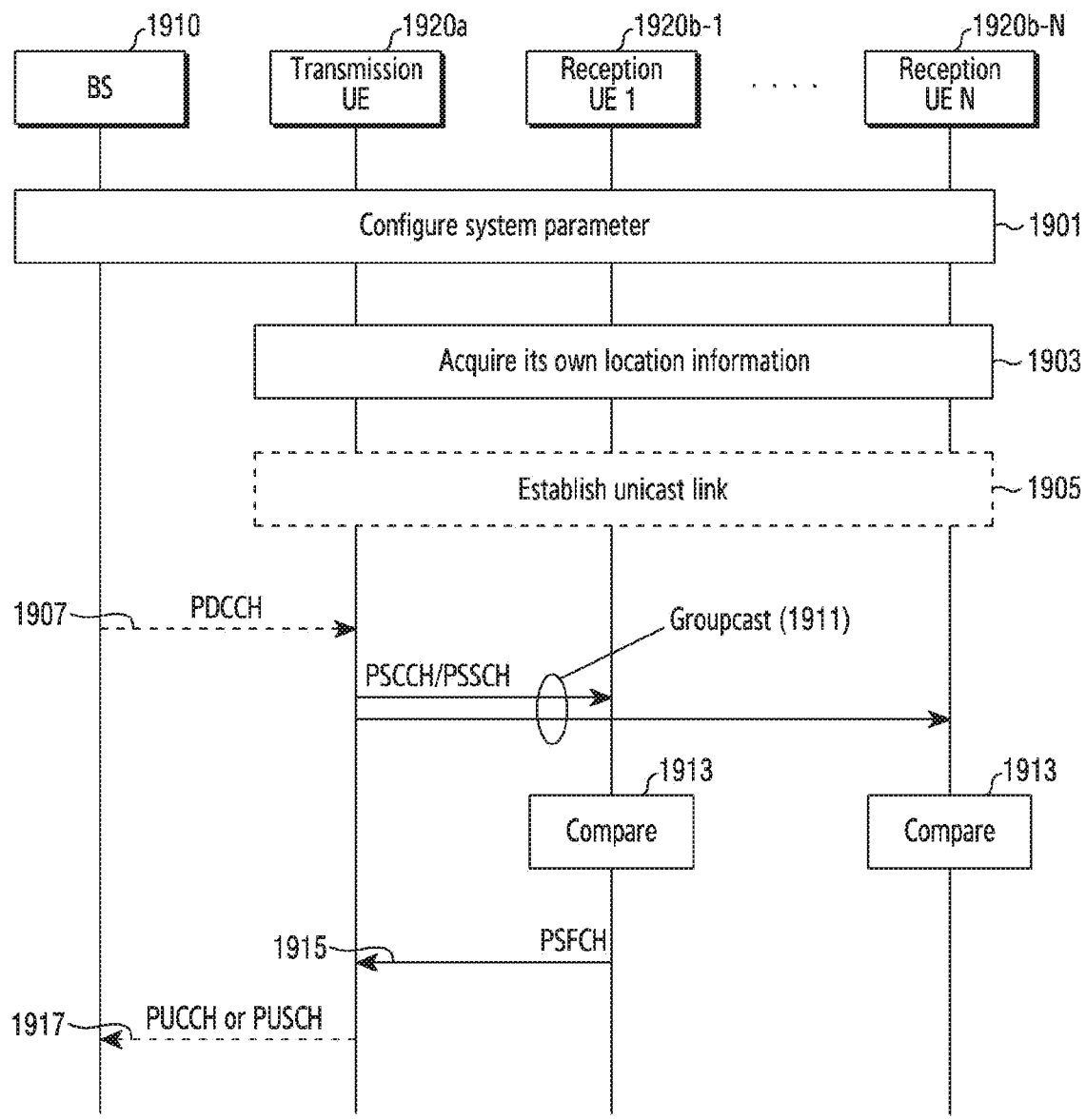
FIG. 19 illustrates another example of the sidelink HARQ operation method in a wireless communication system according to an embodiment of the disclosure.

FIG. 19 illustrates another example of the sidelink HARQ operation method in a wireless communication system according to an embodiment of the disclosure.

FIG. 19 illustrates signal exchange between a BS 1910, a transmission UE 1920*a*, a reception UE 1920*b*-1, . . . , a reception UE 1920*b*-N according to a sidelink communication procedure in the case of groupcast. A reception UE 1920*b*-*i* may be used as an example to describe the operation of the reception UE or describe the reception UE.

Referring to FIG. 19, in operation 1901, the BS 1910 configures a system parameter. In FIG. 19, the transmission UE 1920*a* and the reception UEs 1920*b*-1 to 1920*b*-N may receive system information for sidelink communication from the BS 1910. A parameter for sidelink communication may be configured in UEs receiving the system information. When the transmission UE 1920*a* and the reception UEs 1920*b*-1 to 1920*b*-N exist outside the coverage of the BS 1920 (out-of-coverage scenario of FIG. 6A), the transmission UE 1920*a* and the reception UEs 1920*b*-1 to 1920*b*-N may receive a configuration of the parameter for sidelink communication in advance or may receive the configuration through a Sidelink Master Information Block (SL-MIB) transmitted through a sidelink synchronization channel.

When the sidelink HARQ operation method of FIG. 19 is applied to a groupcast communication scenario performed without any PC-5 RRC connection setup, a unicast link establishment procedure between the transmission UE 1920*a* and each of the reception UEs 1920*b*-1 to 1920*b*-N illustrated in FIG. 19 may be omitted. However, the HARQ operation method of FIG. 19 may be applied when the unicast link establishment procedure between the transmission UE 1920*a* and each of the reception UEs 1920*b*-1 to 1920*b*-N is performed as in operation 1905. In operation 1905, the transmission UE 1920*a* and the reception UE 1920*b*-*i* establish a link. In such a scenario, the unicast link establishment procedure may be included in FIG. 19. Further, although FIG. 19 illustrates that the unicast link establishment procedure is performed after system parameter configuration information of the BS 1910 is received, the system parameter configuration information may be received after the unicast link establishment procedure is performed. When the BS 1910 does not exist, the parameter for sidelink communication may be configured through the SL-MIB after the unicast link establishment procedure is performed.

Unlike FIG. 18, the transmission UE 1920*a* and the reception UEs 1920*b*-1 to 1920*b*-N may use their own location information for the HARQ operation in FIG. 19. In operation 1903, each of the transmission UE 1920*a* and the reception UEs 1920*b*-1 to 1920*b*-N may acquire its own location information. The location information may be an ID of a zone including the UE or (x, y) coordinates of the UE calculated through latitude and longitude of the UE, but is not limited thereto. Although FIG. 19 illustrates that location information is acquired before the link establishment procedure, the embodiments are not limited thereto. That is, after the link establishment, the transmission UE 1920*a* and the reception UEs 1920*b*-1 to 1920*b*-N may acquire their own location information.

When the resource allocation method in mode 1 illustrated in FIG. 12 is used in FIG. 19, the BS 1910 may transmit sidelink scheduling information to the groupcast transmission UE 1920*a* through a downlink control channel (Physical Downlink Control Channel (PDCCH)) in operation 1907. In operation 1911, the transmission UE 1920*a* receiving the sidelink scheduling information through the PDCCH may transmit sidelink control information and data information to the reception UEs 1920*b*-1 to 1920*b*-N through a PSCCH and a PSSCH based on scheduling information. At this time, Sidelink Control Information (SCI) may be transmitted separately through two operations. SCI transmitted through the PSCCH may be called first SCI and SCI transmitted through the PSSCH may be called second SCI. The first SCI and the second SCI may be transmitted through the same sidelink slot or different sidelink slots. Different pieces of sidelink control information may be included in the first SCI and the second SCI. For example, both a destination identifier (for example, destination L2 ID) and a source identifier (for example, transmitter L2 ID) may be inserted into the first SCI and transmitted. Alternatively, the destination identifier (for example, destination L2 ID) may be transmitted through the first SCI, and the source identifier (for example, transmitter L2 ID) may be inserted into the second SCI and transmitted. Further, 1-bit information indicating whether to activate or deactivate the HARQ operation may be included in the first SCI or the second SCI. More specifically, when information indicating deactivation of the HARQ operation is included in the first SCI or the second SCI even though PSFCH resource configuration information of the HARQ operation (for example, a period of the PSFCH) is included in the resource pool configuration information, the transmission UE 1920*a* may deactivate the HARQ operation. The reason thereof is described below.

In the case of broadcast communication, sidelink control information and data information are transmitted to a plurality of unspecified UEs, and thus it may be difficult to operate the HARQ in broadcast communication. In the case of unicast and groupcast communication, the HARQ operation may be or may not be configured according to a QoS of sidelink data. For example, specific sidelink data has high requirements of reception reliability and thus may configure the HARQ operation. However, specific sidelink data has low requirements of reception reliability, and thus may not configure the HARQ operation. In another example, specific sidelink data has high requirements of a delay time of sidelink communication (that is, short delay time), and thus may not configure the HARQ operation. However, specific sidelink data has low requirements of a delay time (that is, long delay time is no problem), and thus may configure the HARQ operation. As described above, the HARQ operation may be configured or released according to the QoS of sidelink data transmitted by the transmission UE 1920*a*. Since whether to configure the HARQ operation may vary depending on the QoS, the configuration may be performed by a V2X layer receiving the QoS from an application layer or an application that manages the QoS.

However, in this case, the HARQ operation of the reception UE 1920-*i* may be impossible. More specifically, the HARQ operation should be performed by a PHY/MAC layer. However, if the HARQ operation is managed by a V2X layer or an application layer, the PHY/MAC layer of the reception UE 1920*b*-*i* cannot perform the HARQ operation. That is, the PHY/MAC layer of the reception UE 1920b-i should recognize whether to operate the HARQ before transmitting the corresponding packet to the V2X layer or the application layer of the reception UE, and the reception UE 1920b-i may perform HARQ combining in the PHY layer on the basis thereof. Accordingly, for the HARQ operation of the PHY/MAC layer, the transmission UE 1920a may include a 1-bit indicator indicating whether to operate the HARQ in the first SCI or the second SCI.

Meanwhile, as illustrated in FIG. 13, the resource allocation method in mode 2 may be used in FIG. 19. In this case, unlike in FIG. 19, the operation (operation 1907) in which the transmission UE 1920a receives scheduling information from the BS 1910 through the PDCCH may be omitted in FIG. 19.

When the first SCI of the PSCCH transmitted from the transmission UE 1920a indicates the destination L2 ID of the reception UE, the reception UE 1920b-i may decode the PSSCH. At this time, the reception UE 1920b-i may transmit each of HARQ-ACK and HARQ-NACK to the transmission UE 1920a or only HARQ-NACK to the transmission UE 1920a according to an HARQ feedback method and whether the decoding of the PSSCH is successful indicated by the received first SCI or second SCI. For example, when an HARQ feedback method of transmitting each of HARQ-ACK and HARQ-NACK to the transmission UE 1920a is indicated by the first SCI or the second SCI, the reception UE 1920b-i may transmit HARQ-ACK to the transmission UE 1920a if the PSSCH decoding is successful, and transmit HARQ-NACK to the transmission UE 1920a if the PSSCH decoding fails. On the other hand, when the transmission UE 1920a indicates an HARQ feedback method of transmitting only HARQ-NACK in the first SCI or the second SCI, the reception UE 1920b-i may transmit HARQ-NACK to the transmission UE 1920a only when the PSCCH decoding fails. That is, the reception UE 1920b-i may not transmit HARQ-ACK to the transmission UE 1920a when the PSSCH decoding is successful.

The transmission UE 1920a may explicitly or implicitly indicate, through first SCI or second SCI, the HARQ feedback method of transmitting only HARQ-NACK. Also, the transmission UE 1920a may transmit its own location information range requirements of a sidelink data packet transmitted by the transmission UE through second SCI. The range requirements are not limited to reception through the SCI, and may use a value pre-configured in the UE or a value configured by the BS 1910. Alternatively, the total number of range requirements may be X, and Y of the X range requirements may be included in sidelink resource pool information through a configuration or pre-configuration of the BS 1910 (X>Y). One of the configured or pre-configured Y values may be transmitted to the reception UE 1920b-i through the first or second SCI.

Location information of the transmission UE 1920a may be an ID of a zone in which the transmission UE 1920a is located or (x, y) coordinates of the transmission UE 1920a calculated through latitude and longitude of the transmission UE 1920a, but is not limited thereto. The requirements may be expressed in units of meters, and may refer to distance information for transmission of the sidelink data packet. For example, the range requirements may be at least one of a maximum or minimum distance to which the sidelink data packet is transmitted.

The reception UEs 1920b-1 to 1920b-N receiving the PSCCH and the PSSCH from the transmission UE 1920a may determine whether the destination L2 ID included in the first SCI indicates the reception UE. When the destination ID included in the first SCI indicates the reception UE, the reception UE 1920b-i may decode the second SCI and decode the PSSCH through time and/or frequency resource allocation information of the PSSCH included in the second SCI (time and/or frequency resource allocation information of the PSSCH is included in the second SCI). In another example, when the destination ID included in the first SCI indicates the reception UE, the reception UE 1920b-i may decode the PSSCH through time and/or frequency resource allocation information of the PSSCH included in the first SCI (time and/or frequency resource allocation information of the PSSCH is included in the first SCI).

The reception UE 1920b-i may finally determine whether sidelink data is transmitted to the reception UE itself through the destination L2 ID included in a MAC-CE transmitted through the PSSCH after the PSSCH is decoded. That is, the destination L2 ID may consist of N bits, and N1 bits may be transmitted through the first SCI or the second SCI and N2 bits may be transmitted through the MAC-CE (N=N1+N2). When the destination L2 ID included in the received SCI does not indicate the reception UE, the reception UE 1920b-i may not decode the PSSCH indicated by the corresponding SCI.

In operation 1913, the reception UE 1920b-i may compare a distance between the reception UE 1920b-i and the transmission UE 1920a with a threshold. That is, each of the reception UEs 1920b-i to 1920b-N may calculate a distance between the reception UE and the transmission UE 1920a and compare the calculated distance with a threshold distance included in range requirements.

When the first SCI transmitted from the transmission UE 1920a indicates the destination L2 ID of the reception UE 1920b-i, the reception UE 1920b-i may calculate a distance between the transmission UE 1920a and itself (that is, the reception UE 1920b-i) through its own location information and location information of the transmission UE 1920a included in the first or second SCI. For example, the distance between the transmission UE 1920a and the reception UE 1920b-N may be defined as $d_N$. Further, the reception UE 1920b-N may compare $d_{TH}$ and $d_N$ through range requirements (defined as $d_{TH}$) included in the first or second SCI. The reception UE 1920b-N may perform the HARQ operation according to the result of comparison between $d_{TH}$ and $d_N$.

When the measured (calculated or acquired) distance between the transmission UE 1920a and the reception UE is larger than (or equal to) the range requirements, the reception UE 1920b-i may not transmit HARQ feedback information to the transmission UE 1920a regardless of whether decoding of the PSSCH received by the reception UE is successful. That is, in the case of $d_N > d_{TH}$ or $d_N \geq d_{TH}$, the reception UE 1920b-i may not transmit HARQ feedback. On the other hand, in the case of $d_N \leq d_{TH}$ or $d_N < d_{TH}$, the reception UE 1920b-i may transmit HARQ feedback to the transmission UE 1920a. Further, the reception UE 1920b-i may transmit HARQ-NACK to the transmission UE 1920a only when the PSSCH decoding fails. That is, even though the distance condition is satisfied, HARQ-ACK may not be transmitted to the transmission UE 1920a when the PSSCH decoding is successful. FIG. 19 illustrates an example of the case in which the reception UE 1920b-i transmits HARQ-NACK to the transmission UE 1920a through the PSFCH. In operation 1915, only the reception UE 1920b-i may transmit HARQ-NACK to the transmission UE 1920a through the PSFCH and other UEs (for example, UEs 1920b-2 to 1920b-N) may not transmit HARQ feedback information to the transmission UE 1920a.

When two or more reception UEs satisfy the condition (that is, $d_N \le d_{TH}$ or $d_N < d_{TH}$) and the PSSCH decoding fails, the two or more reception UEs may transmit HARQ-NACK to the transmission UE 1920a. At this time, PSFCH time/frequency/code resources used by the two or more reception UEs for HARQ-NACK transmission may be the same. Accordingly, the transmission UE 1920a receiving the HARQ feedback information does not need to know how many reception UEs transmitted NACK information, and the transmission UE 1920a receiving the NACK information may retransmit the PSSCH. When the transmission UE 1920a does not receive NACK information and new sidelink data to be transmitted is generated, the transmission UE 1920a may transmit the new PSSCH. When new sidelink data to be transmitted is not generated, the transmission UE 1920a may stop the PSSCH transmission operation.

In operation 1917, the transmission UE 1920a may transmit sidelink HARQ feedback information received from the reception UE 1920b-i to the BS 1910. The transmission UE 1920a may transmit sidelink HARQ feedback information received from the reception UE 1920b-i to the BS 1910 according to a configuration of the BS 1910. The sidelink HARQ feedback information may be transmitted through a PUCCH or a PUSCH.

Information indicating whether to use the sidelink HARQ operation of FIG. 18 or the sidelink HARQ operation of FIG. 19 in groupcast communication may be included in resource pool configuration information configured by the BS 1910, and when there is no BS 1910, may be included in pre-configured resource pool configuration information. In another example, whether to apply FIG. 18 or FIG. 19 may be implicitly or explicitly indicated by the transmission UE 1920a through first SCI or second SCI. In an example of the implicit indication, when location information of the transmission UE 1920a and range requirement information are included in SCI, the reception UE 1920b-i may indirectly recognize the use of the method of FIG. 19. When location information of the transmission UE 1920a and range requirement information are not included in SCI, the reception UE 1920b-i may indirectly recognize the use of the method of FIG. 18. In an example of the explicit indication, the transmission UE 1920a may insert a 1-bit indicator into the first SCI or the second SCI and transmit the first or second SCI. The UE receiving the SCI may apply the method of FIG. 18 when the indicator indicates "1", and apply the method of FIG. 19 when the indicator indicates "0". According to the configuration, the method of FIG. 18 may be applied when the indicator indicates "0" and the method of FIG. 19 may be applied when the indicator indicates "1".

FIG. 19 illustrates the HARQ operation method in groupcast communication, but the same may also be applied to unicast communication.

Figure 20:
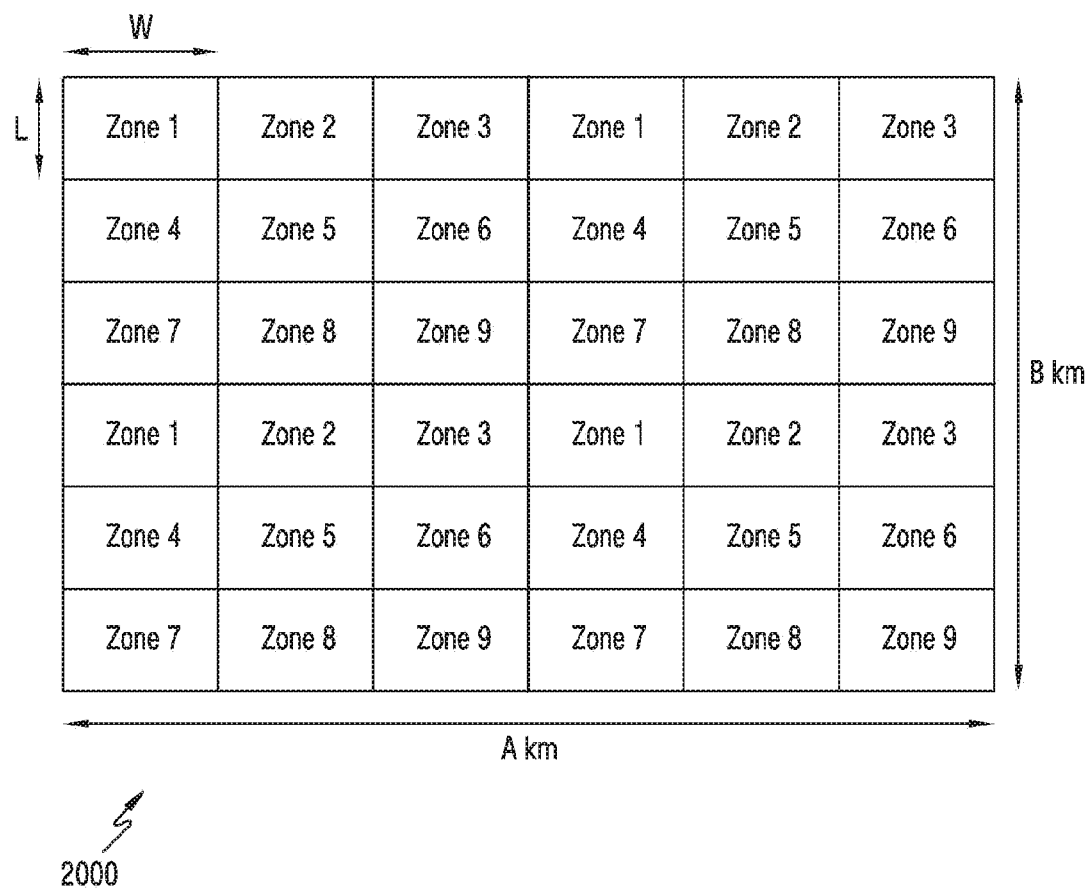
FIG. 20 illustrates an example of a zone identifier (ID) usage method in a wireless communication system according to an embodiment of the disclosure.

FIG. 20 illustrates an example of a method using a zone identifier (ID) in a wireless communication system according to an embodiment of the disclosure.

Referring to FIG. 20, the BS may transmit zone configuration information to the sidelink UE within the cell through SL-ZoneConfig Information Element (IE) of sidelink system information. The SL-ZoneConfig IE may include a zoneWidth parameter indicating the width of the zone (W in FIG. 20), a zoneLength parameter indicating the length of the zone (L in FIG. 20), a zoneIdLongiMod parameter indicating the total number of zones based on longitude, and a zoneIdLatiMod parameter indicating the total number of zones based on latitude. Each of the zoneWidth and zoneLength parameters may be configured as one of 5 m, 10 m, 20 m, 30 m, 40 m, and 50 m. At this time, zoneWidth and zoneLength may be configured as the same value (that is, zoneWidth=zoneLength∈{5 m, 10 m, 20 m, 30 m, 40 m, 50 m}). Further, each of the zoneIdLongiMod and zoneIdLatiMode parameters may be configured as an integer from 1 to 64. That is, in a region 2000 having a width of A km and a length of B km in FIG. 20, a width and a length (W, L) of each zone and how many zones are included in (A×B) km may be configured using parameters within the SL-ZoneConfigIE configured by the BS (pre-configured when there is no BS).

Meanwhile, as illustrated in FIG. 19, range requirements of the sidelink data packet may be configured in the sidelink resource pool (configured by the BS or pre-configured when there is no BS). There may be 32 range requirements such as {20, 50, 80, 100, 120, 150, 180, 200, 220, 250, 270, 300, 320, 350, 370, 400, 420, 450, 480, 500, 550, 600, 700, 1000, spare, spare, spare, spare, spare, spare, spare, spare}, and 16 range requirements of the 32 range requirements may be configured in the sidelink resource pool. The transmission UE may receive range requirements of the sidelink data packet transmitted by the transmission UE from a higher layer, and the higher layer may provide one of the 16 range requirements configured in the sidelink resource pool. The sidelink transmission UE may transmit the range requirements to the reception UE through a 4-bit field of the first or second SCI. In the example, the sidelink resource pool may be a sidelink transmission resource pool, a sidelink reception resource pool, or both a transmission resource pool and a reception resource pool.

Meanwhile, when the BS configures two or more sidelink resource pools (when two or more sidelink transmission resource pools are pre-configured in the case where there is no BS), different range requirements and zone sizes (W and L, where W=L) may be configured in the respective resource pools. For example, since the speed of the sidelink UE (that is, the speed of a vehicle) is high in a region in which an expressway is located, locations at a time point at which the transmission UE transmits its own zone ID and a time point at which the reception UE receives the zone ID and performs the HARQ operation illustrated in FIG. 19 may rapidly change. Accordingly, in this case, when the zone size is small, an error in calculation of a distance using the zone ID may increase, and thus it is required to configure the zone size to be large. On the other hand, in the case of a downtown area, the speed of the sidelink UE (that is, the speed of a vehicle) is not fast, and thus it is possible to increase the accuracy of the HARQ operation by configuring the zone size to be small.

In another example, when the range requirements are small (for example, 20 m) the zone size cannot be large. At this time, it is possible to increase the accuracy of the HARQ operation by maintaining the zone size to be small. On the other hand, when the range requirements are large (for example, 500 m), if the zone size is too small, signaling overhead for indicating different zone sizes may significantly increase. In this case, it is possible to reduce signaling overhead by maintaining the zone size to be the appropriate size.

Through the above examples, different zone sizes and range requirements may be configured (pre-configured) for each sidelink resource pool, and it may be noted that the range requirements and the zone size have a correlation therebetween. Accordingly, when a plurality of resource pools is configured, the transmission UE may configure a transmission resource pool in consideration of range requirements of the sidelink data packet to be transmitted by the transmission UE. For example, range requirements such as the 16 values {20, 50, 80, 100, 120, 150, 180, 200, 220, 250, 270, 300, 320, 350, 370, 400} may be configured in sidelink resource pool A. Further, range requirements such as the 16 values {420, 450, 480, 500, 550, 600, 700, 1000, spare, spare, spare, spare, spare, spare, spare, spare} may be configured in sidelink resource pool B. At this time, when the requirement of the sidelink data packet to be transmitted by the transmission UE corresponds to 300 m, the transmission UE may select resource pool A.

In the example, resource pool A and resource pool B include different range requirements. On the other hand, resource pool A and resource pool B may include the same range requirements. For example, range requirements such as the 16 values {20, 50, 80, 100, 120, 150, 180, 200, 220, 250, 270, 300, 320, 350, 370, 400} may be configured in sidelink resource pool C. Further, range requirements such as the 16 values {350, 370, 400, 420, 450, 480, 500, 550, 600, 700, 1000, spare, spare, spare, spare, spare} may be configured in sidelink resource pool D. In this case, the transmission UE may randomly select one of resource pool C and resource pool D. In another example, the transmission UE may select one transmission resource pool through at least one of the methods described with reference to FIG. 15.

According to one embodiments of this disclosure, method of operating a User Equipment (UE) in a wireless communication system, the method comprising: acquiring configuration information of a plurality of sidelink resource pools; and transmitting a sidelink signal to another UE using one resource pool among the plurality of sidelink resource pools, wherein the plurality of sidelink resource pools are configured within an equal Bandwidth Part (BWP).

According to one embodiments, wherein the one resource pool is selected based on at least one of a characteristic related to sidelink data or service, a characteristic of the plurality of sidelink resource pools, a channel quality, or a state of the UE.

According to one embodiment, wherein the plurality of sidelink resource pools includes a first resource pool including a feedback channel and a second resource pool which does not include the feedback channel.

According to one embodiment, wherein the feedback channel is included in some of slots belonging to the first resource pool.

According to one embodiment, wherein the feedback channel includes some of bandwidths occupied by the first resource pool.

According to one embodiment, wherein the plurality of sidelink resource pools includes at least two of a first resource pool for unicast communication, a second resource pool for groupcast communication, or a third resource pool for broadcast communication.

According to one embodiment, wherein the one resource pool is selected based on a type of communication that the UE desires to perform.

According to one embodiment, wherein the plurality of sidelink resource pools include a first resource pool including a feedback channel and a second resource pool which does not include the feedback channel, and wherein the one resource pool is selected based on whether a Hybrid Automatic Repeat and Request (HARQ) feedback is operated.

According to one embodiment, wherein the plurality of sidelink resource pools include at least one slot which does not overlap on a time axis, and wherein the one resource pool is selected as a resource pool including resources located first on a time axis after generation of sidelink data.

According to one embodiment, wherein the plurality of sidelink resource pools is configured to correspond to ranges of different channel qualities, and wherein the one resource pool is selected based on a channel quality between a BS and the UE or a channel quality between the UE and the other UE.

According to one embodiment, the method further comprising: receiving information on ranges of the channel qualities corresponding to the plurality of sidelink resource pools.

According to one embodiment, wherein the one resource pool is selected based on a congestion level determined based on all resources of the plurality of sidelink resource pools and resources occupied by other UEs.

According to one embodiment, wherein the one resource pool is selected based on a Quality of Service (QoS) of a sidelink service.

According to one embodiment, a user equipment (UE) in a wireless communication system, the UE comprising: a transceiver; and at least one processor operatively coupled to the transceiver, wherein the at least one processor is configured to control to: acquire configuration information of a plurality of sidelink resource pools, and transmit a sidelink signal to another UE using one resource pool among the plurality of sidelink resource pools, and wherein the plurality of sidelink resource pools are configured with an equal Bandwidth Part (BWP).

According to one embodiment, wherein the one resource pool is selected based on at least one of a characteristic related to sidelink data or service, a characteristic of the plurality of sidelink resource pools, a channel quality, or a state of the UE.

According to one embodiment, wherein the plurality of sidelink resource pools includes at least two of a first resource pool for unicast communication, a second resource pool for groupcast communication, or a third resource pool for broadcast communication, and wherein the one resource pool is selected based on a type of communication that the UE desires to perform.

According to one embodiment, wherein the plurality of sidelink resource pools includes a first resource pool including a feedback channel and a second resource pool which does not include the feedback channel, and wherein the one resource pool is selected based on whether a Hybrid Automatic Repeat and Request (HARQ) feedback is operated.

According to one embodiment, wherein the plurality of sidelink resource pools includes at least one slot which does not overlap on a time axis, and wherein the one resource pool is selected as a resource pool including resources located first on a time axis after generation of sidelink data.

According to one embodiment, wherein the plurality of sidelink resource pools is configured to correspond to ranges of different channel qualities, and wherein the one resource pool is selected based on a channel quality between a BS and the UE or a channel quality between the UE and the other UE.

According to one embodiment, wherein the one resource pool is selected based on a congestion level determined based on all resources of the plurality of sidelink resource pools and resources occupied by other UEs.

According to one embodiment, wherein the one resource pool is selected based on a Quality of Service (QoS) of a sidelink service.

Also, the PSFCH, PSCCH, and PSSCH included in the present disclosure refer to physical channels for NR or LTE, and are not limited to any one.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) for sidelink communication, the method comprising:
    receiving, from a base station (BS), system information on a plurality of sidelink resource pools; and
    identifying the plurality of the sidelink resource pools based on the system information,
    wherein, in case that the UE transmits a first sidelink signal, transmitting the first sidelink signal using one sidelink resource pool among the plurality of the sidelink resource pools,
    wherein, in case that the UE receives a second sidelink signal, receiving the second sidelink signal using the plurality of the sidelink resource pools, and
    wherein the plurality of the sidelink resource pools includes a first resource pool including a feedback channel and a second resource pool which does not include the feedback channel.

2. The method of claim 1,
    wherein the plurality of the sidelink resource pools are configured within equal bandwidth parts (BWPs), and
    wherein the plurality of the sidelink resource pools are configured for one carrier.

3. The method of claim 1, further comprising:
    receiving, from the BS, a downlink control information (DCI); and
    identifying whether the DCI is a first DCI or a second DCI based on a radio network temporary identifier (RNTI),
    wherein the DCI is one of:
        the first DCI for a new radio (NR) sidelink, and
        the second DCI for a long term evaluation (LTE) sidelink, and wherein the RNTI is one of:
            a first RNTI for the NR sidelink, and
            a second RNTI for the LTE sidelink.

4. The method of claim 3, further comprising:
    if the DCI is the second DCI, obtaining timing offset information from the DCI,
    wherein the timing offset information comprises information between a NR slot receiving the DCI and an LTE subframe to be applying the DCI.

5. The method of claim 3,
    wherein the first DCI includes indicator on activation or release semi-persistent scheduling (SPS) for the NR sidelink, and
    wherein the second DCI includes indicator on activation or release SPS for the LTE sidelink.

6. The method of claim 1, wherein the first sidelink signal comprising a sidelink control information or data corresponding the sidelink control information.

7. A method performed by a base station (BS) for sidelink communication, the method comprising:
    transmitting, to a user equipment (UE), system information on a plurality of sidelink resource pools,
    wherein, in case that the UE transmits a first sidelink signal, the first sidelink signal is, by the UE, transmitted using one sidelink resource pool among the plurality of the sidelink resource pools,
    wherein, in case that the UE receives a second sidelink signal, the second sidelink signal is, by the UE, received using the plurality of the sidelink resource pools, and
    wherein the plurality of the sidelink resource pools includes a first resource pool including a feedback channel and a second resource pool which does not include the feedback channel.

8. The method of claim 7, wherein the plurality of the sidelink resource pools are configured within equal bandwidth parts (BWPs).

9. The method of claim 7, further comprising:
    transmitting, to the UE, a downlink control information (DCI),
    wherein the DCI is identified as a first DCI or a second DCI based on a radio network temporary identifier (RNTI),
    wherein the DCI is one of:
        the first DCI used for a new radio (NR) sidelink, and
        the second DCI used for a long term evaluation (LTE) sidelink, and wherein the RNTI is one of:
            a first RNTI for the NR sidelink, and
            a second RNTI for the LTE sidelink.

10. The method of claim 9, further comprising:
if the DCI is the second DCI, obtaining timing offset information from the DCI,
wherein the timing offset information comprises information between a NR slot receiving the DCI and an LTE subframe to be applying the DCI.

11. The method of claim 9,
wherein the first DCI includes indicator on activation or release semi-persistent scheduling (SPS) for the NR sidelink, and
wherein the second DCI includes indicator on activation or release semi-persistent scheduling (SPS) for the LTE sidelink.

12. The method of claim 7, wherein the first sidelink signal comprising a sidelink control information or data corresponding the sidelink control information.

13. A user equipment (UE) for sidelink communication, the UE comprising:
at least one transceiver; and
at least one processor, operably connected to the at least one transceiver, and configured to:
receive, from a base station (BS), system information on a plurality of sidelink resource pools, and
identify the plurality of the sidelink resource pools based on the system information,
wherein, in case that the UE transmits a first sidelink signal, transmitting the first sidelink signal using one sidelink resource pool among the plurality of the sidelink resource pools,
wherein, in case that the UE receives a second sidelink signal, receiving the second sidelink signal using the plurality of the sidelink resource pools, and
wherein the plurality of the sidelink resource pools includes a first resource pool including a feedback channel and a second resource pool which does not include the feedback channel.

14. The UE of claim 13,
wherein the plurality of the sidelink resource pools are configured within equal bandwidth parts (BWPs).

15. The UE of claim 13, the processor is further configured to:
receive, from the BS, a downlink control information (DCI), and
identify whether the DCI is a first DCI or a second DCI based on a radio network temporary identifier (RNTI),
wherein the DCI is one of:
the first DCI for a new radio (NR) sidelink, and
the second DCI for a long term evaluation (LTE) sidelink, and wherein the RNTI is one of:
a first RNTI for the NR sidelink, and
a second RNTI for the LTE sidelink.

16. The UE of claim 15, wherein the at least one processor is further configured to:
if the DCI is the second DCI, obtain timing offset information from the DCI,
wherein the timing offset information comprises information between a NR slot receiving the DCI and an LTE subframe to be applying the DCI.

17. The UE of claim 15,
wherein the first DCI includes indicator on activation or release semi-persistent scheduling (SPS) for the NR sidelink, and
wherein the second DCI includes indicator on activation or release SPS for the LTE sidelink.

18. The UE of claim 13, wherein the first sidelink signal comprising a sidelink control information or data corresponding the sidelink control information.

* * * * *